(12) United States Patent
Berger et al.

(10) Patent No.: US 12,448,764 B2
(45) Date of Patent: Oct. 21, 2025

(54) FOOD WASTE DISPOSER THROAT BAFFLE APPARATUS AND METHOD

(71) Applicant: InSinkErator LLC, Benton Harbor, MI (US)

(72) Inventors: Thomas R. Berger, St. Louis, MO (US); Brian Retzke, Downers Grove, IL (US); Mile Nikolic, Wadsworth, IL (US)

(73) Assignee: Insinkerator LLC, Benton Harbor, MI (US)

( * ) Notice: Subject to any disclaimer, the term of this patent is extended or adjusted under 35 U.S.C. 154(b) by 42 days.

(21) Appl. No.: 18/094,257

(22) Filed: Jan. 6, 2023

(65) Prior Publication Data

US 2023/0228074 A1 Jul. 20, 2023

Related U.S. Application Data

(62) Division of application No. 16/963,012, filed as application No. PCT/US2019/014806 on Jan. 23, 2019, now Pat. No. 11,549,248.

(Continued)

(51) Int. Cl.
*E03C 1/266* (2006.01)
*B02C 18/00* (2006.01)
(Continued)

(52) U.S. Cl.
CPC ........ *E03C 1/2665* (2013.01); *B02C 18/0092* (2013.01); *B02C 18/12* (2013.01);
(Continued)

(58) Field of Classification Search
None
See application file for complete search history.

(56) References Cited

U.S. PATENT DOCUMENTS 2,785,864 A 3/1957 Jordan
2,787,423 A 4/1957 Moore
(Continued)

FOREIGN PATENT DOCUMENTS

CN 101198751 6/2008
CN 101722089 6/2010
(Continued)

OTHER PUBLICATIONS

Communication Pursuant to Rule 94(3) from the European Patent Office for Patent Application No. 19704167.6 dated Jun. 15, 2022 (1 page).

(Continued)

*Primary Examiner* — Jacob T Minskey
*Assistant Examiner* — Virak Nguon
(74) *Attorney, Agent, or Firm* — Brooks Kushman P.C.

(57) ABSTRACT

Baffles for food waste disposers, systems employing such baffles, and methods of assembling, manufacturing, fabricating, or operating such baffles or baffle systems are disclosed herein. In one example embodiment, a baffle for implementation in connection with a food waste disposer includes a rim portion, a plurality of flaps, and a plurality of living hinges, wherein the rim portion, living hinges, and flaps constitute a single integrally-formed structure. The respective living hinges permit the respective flaps to be rotatable about respective axes that respectively are substantially tangent to respective locations along or proximate to the rim portion, so that the respective flaps can be rotated to respective closed positions. Either the living hinges or at least one additional component tend to cause the respective flaps to remain at the respective closed positions or to return to the respective closed positions when not at the respective closed positions.

20 Claims, 6 Drawing Sheets

Related U.S. Application Data

(60) Provisional application No. 62/622,539, filed on Jan. 26, 2018.

(51) Int. Cl.
*B02C 18/12* (2006.01)
*B29C 39/10* (2006.01)
*B29K 101/12* (2006.01)
*E03C 1/262* (2006.01)

(52) U.S. Cl.
CPC .......... *B29C 39/10* (2013.01); *B02C 2201/06* (2013.01); *B29K 2101/12* (2013.01); *E03C 1/262* (2013.01)

(56) References Cited

U.S. PATENT DOCUMENTS

| | | | |
|---|---|---|---|
| 2,834,554 | A | 5/1958 | Bebinger |
| 2,875,958 | A | 3/1959 | Wieczorek |
| 2,940,677 | A | 6/1960 | Jordan |
| 2,980,351 | A | 4/1961 | Greene |
| 3,432,108 | A | 3/1969 | Enright |
| 3,524,596 | A | 8/1970 | Smith |
| 6,719,228 | B2 | 4/2004 | Breger et al. |
| 6,735,791 | B1 | 5/2004 | Lordahl et al. |
| 7,021,574 | B2 | 4/2006 | Breger et al. |
| D539,078 | S | 3/2007 | Anderson et al. |
| D539,087 | S | 3/2007 | Anderson et al. |
| 7,264,188 | B2 | 9/2007 | Anderson et al. |
| D581,723 | S | 12/2008 | Pan |
| D799,888 | S | 10/2017 | McClory et al. |
| D799,889 | S | 10/2017 | McClory et al. |
| D799,890 | S | 10/2017 | McClory et al. |
| 2002/0104908 | A1* | 8/2002 | Berger ................. E03C 1/2665 241/21 |
| 2004/0195409 | A1 | 10/2004 | Berger et al. |
| 2006/0097091 | A1* | 5/2006 | Jara-Almonte ....... E03C 1/2665 241/46.013 |
| 2006/0278743 | A1 | 12/2006 | Anderson et al. |
| 2013/0327860 | A1 | 12/2013 | Harooni |
| 2015/0367724 | A1* | 12/2015 | Kopiec ............ B60K 15/03504 264/296 |
| 2016/0040413 | A1 | 2/2016 | Starkey et al. |
| 2016/0076234 | A1 | 3/2016 | Hammer et al. |
| 2018/0361391 | A1 | 12/2018 | Starkey et al. |
| 2021/0164208 | A1 | 6/2021 | McClory |

FOREIGN PATENT DOCUMENTS

| | | |
|---|---|---|
| CN | 203939099 | 11/2014 |
| CN | 204875981 | 12/2015 |
| CN | 105220742 | 1/2016 |
| CN | 205329795 | 6/2016 |
| CN | 106284555 | 1/2017 |
| CN | 106687648 | 5/2017 |
| CN | 206768951 | 12/2017 |
| DE | 959244 | 2/1957 |
| GB | 1120289 | 7/1968 |
| JP | 2005500148 | 1/2005 |
| WO | 02062478 | 8/2002 |

OTHER PUBLICATIONS

Communication Pursuant to Rule 94(3) from the European Patent Office for Patent Application No. 19704167.6 dated Feb. 21, 2023 (3 pages).
Notification on Grant of the Patent from the State Intellectual Property Office in China for Application No. 201980039927.7 dated Jun. 1, 2022 (5 pages).
Communication Pursuant to Rule 71(3) from the European Patent Office for Patent Application No. 19734209.0 dated Jul. 25, 2022 (7 pages).
Anaheim Manufacturing, "Food Waste Disposer Owner's Guide," guide, Doc No. 560C485P01 Rev A, believed to be publicly available as early as Jun. 2006, pp. 1-8.
Anaheim Manufacturing, "3 images showing Removable Baffle," images, available from Anaheim Manufacturing Company, believed to be publicly available as early as Jun. 2006, p. 1.
General Electric Company, "Food Waste Disposer Installation/Use & Care Instructions," instruction guide, Part No. 165D4700P179 Rev 1, Pub No. 49-5853, believed to be publicly available from General Electric as early as Jan. 1998, pp. 1-7.
General Electric Company, "3 images showing Removable Baffle," images, available from General Electric, believed to be publicly available prior to 2002, p. 1.
General Electric Company, "Disposal Food Waste Disposer, Owner's Manual & Installation Instructions," instruction guide, 49-55075, believed to be publicly available from General Electric as early as Aug. 19, 2010, pp. 1-12.
General Electric Company, "3 images showing Removable Baffle," images, believed to be publicly available from General Electric as early as 2011, p. 1.
Emerson Electric Company, "Food Waste Disposer, Mounting Gasket Kit," packaging image, MGK-OO (77047 Rev. B), believed to be publicly available from In-Sink-Erator division of Emerson Electric, prior to 2013, p. 1.
Mking Range Corporation, "3 images showing Removable Baffle," images, available from Viking Range Corporation, believed to be publicly available as early as 2004, p. 1.
Emerson Electric Company, "Food Waste Disposers Model No. 777ss," specs, Form No. H538-04F-02, believed to be publicly available from In-Sink-Erator division of Emerson Electric Co. prior to 2009, p. 1.
Emerson Electric Company, "Household Disposer (UL) Model No. 777SS-1," parts list, Engineer No. 71947, Emerson Electric Co., dated Feb. 16, 1998, p. 1.
Emerson Electric Company, "Badger Disposal Installation Instructions" instruction guide (78649 Rev. B), In-Sink-Erator Division of Emerson Electric Co. (2018) p. 1-2.
Emerson Electric Company, "Food Waste Disposer, Standard Mounting Gasket," packaging image, SMG-OO (77027 Rev. B), believed to be publicly available from In-Sink-Erator division of Emerson Electric Co. prior to 2013, p. 1.
Viking Range Corporation, "Installation Instructions for Heavy-Duty Food Waste Disposer," instruction guide, F1208B (PS0103VR) believed to be publicly available by 2004, pp. 1-4.
Viking Range Corporation, "Heavy-Duty Food Waste Disposer, Use & Care Manual," manual, believed to be publicly available by 2004, pp. 1-7.
Emerson Electric Company, "Evolution Excel Installation Instructions," instruction guide (74167 Rev. A), In-Sink-Erator division of Emerson Electric Co., believed to be publicly available by Oct. 8, 2007, p. 1.
Emerson Electric Company, "Evolution Excel Installation Instructions," instruction guide (78220 Rev. A), In-Sink-Erator division of Emerson Electric Co., believed to be publicly available by Feb. 4, 2016, p. 1.
Emerson Electric Company, "Badger Installation Instructions," instruction guide (76711 Rev. B), available from In-Sink-Erator, believed to be publicly available prior to 2014, pp. 1-14.
Emerson Electric Company, "Removable Baffle, image (Part No. 70966)," available from In-Sink-Erator, believed to be publicly available by 1994.
Emerson Electric Company, "Evolution Antimicrobial Quiet Collar Sink Baffle for Evolution Garbage Disposals," website, available from In-Sink-Erator division of Emerson Electric Co., believed to be publicly available by 2011 (obtained at https://www.homedepot.com/p/InSinkErator-Evolution-Antimicrobial-Quiet-Collar-Sink-Baffle-for-Evolution-Garbage-Disposals-QCB-AM/100466658), pp. 1-3.
Emerson Electric Company, "Antimicrobial Quiet Collar Sink Baffle (Evolution Series)" website (74653D) believed to be publicly available prior to 2013, pp. 1-10; https://insinkerator.emerson.com/en-us/shop/insinkerator/insinkerator-quietclrbaf.

(56) References Cited

OTHER PUBLICATIONS

Whirlpool, "Top 19 Best Food Waste Disposer Parts/List Appliances," brochure, Aug. 18, 2017, pp. 1-5, http://www.listappliances.com/top-19-best-food-waste-disposer-parts[Jul. 29, 2019 2:53:17 PM].
Emerson, "In-Sink-Erator QCB-AM Anti-Microbial Quiet Collar Sink Baffle, 3.25-Inch Diameter . . . ," website, believed to be publicly available at least as early as 1999, pp. 1-9, https://www.amazon.com/dp/B000GX34AE/ref=psdc_3226849011_tl_B01M0FVWTQ.
Emerson Electric Company, "1 image showing Removeable Baffle." image, available from In-Sink-Erator division of Emerson Electric Co., believed to be publicly available by 2011.
PCT/US2019/036949 International Search Report and Written Opinion of the International Searching Authority dated Oct. 24, 2019 (18 pages).
PCT/US2019/036949 International Preliminary Report on Patentability dated Dec. 15, 2020 (1 page).
PCT/US2019/014806 International Search Report and Written Opinion of the International Searching Authority dated May 9, 2019 (11 pages).
PCT/US2019/014806 International Preliminary Report on Patentability dated Jul. 28, 2020 (1 page).
PCT/US2019/036950 International Search Report and Written Opinion of the International Searching Authority dated Oct. 24, 2019 (18 pages).
PCT/US2019/036950 International Preliminary Report on Patentability dated Dec. 15, 2020 (1 page).
First Office Action from the State Intellectual Property Office of China for Application No. 201980018730.5 dated Mar. 26, 2021 (10 pages).
Communication Pursuant to Rules 161(1) and 162 EPC from the European Patent Office for Patent Application No. 19704167.6 dated Aug. 5, 2020 (3 pages).
Response to European Office Action for Patent Application No. 19704167.6 dated Feb. 15, 2021 (3 pages).
Communication Pursuant to Rules 161(1) and 162 EPC from the European Patent Office for Patent Application No. 19734209.0 dated Dec. 23, 2020 (3 pages).
Response to European Office Action for Patent Application No. 19734209.0 dated Jul. 1, 2021 (11 pages).
First Office Action from the State Intellectual Property Office of China for Application No. 2019800399277 dated Sep. 15, 2021 (21 pages).
Response to the First Office Action from the State Intellectual Property Office of China for Patent Application No. 2019800399277 dated Jan. 28, 2022 (33 pages with English Translations of Amended Claims).
Response to European Office Action for Patent Application No. 19704167.6 dated Feb. 15, 2021 (7 pages).

\* cited by examiner

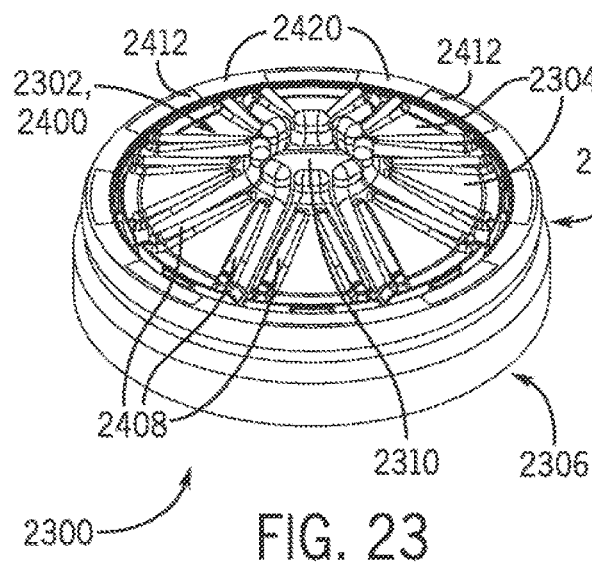
FIG. 23
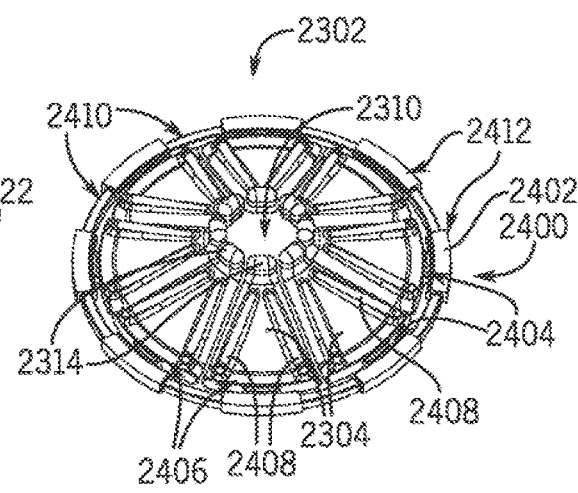
FIG. 24
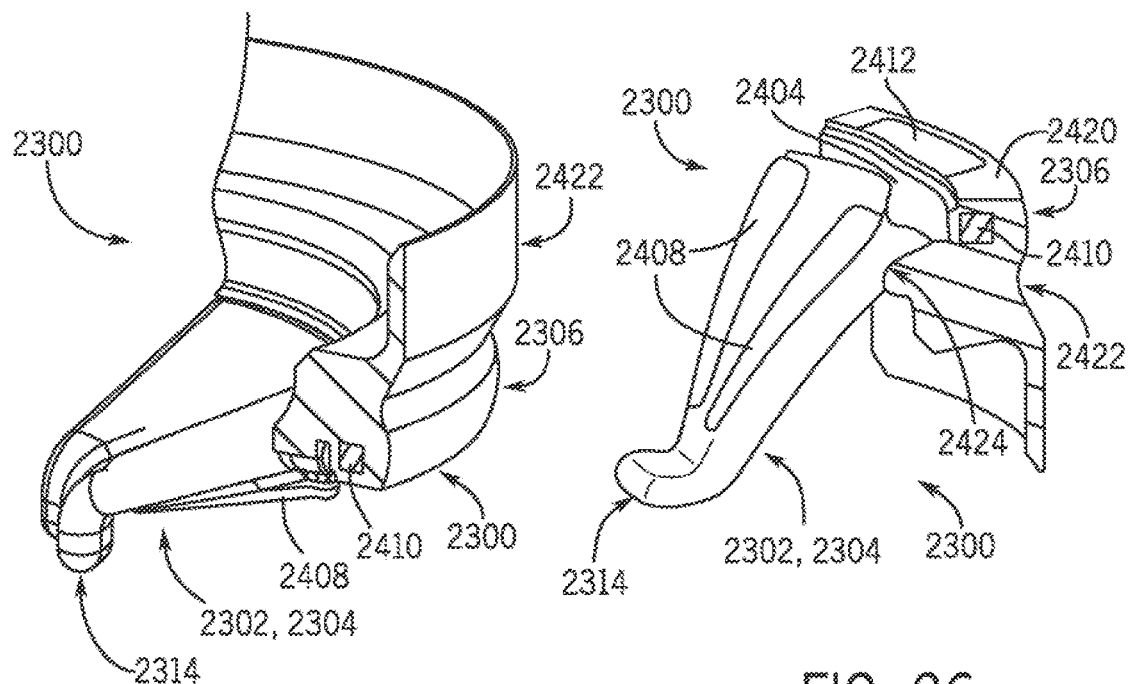
FIG. 25
FIG. 26

FOOD WASTE DISPOSER THROAT BAFFLE APPARATUS AND METHOD

CROSS-REFERENCE TO RELATED APPLICATION

This application is a divisional application of U.S. patent application Ser. No. 16/963,012, filed Jul. 17, 2020, now U.S. Pat. No. 11,549,248, issued Jan. 10, 2023, and entitled "FOOD WASTE DISPOSER THROAT BAFFLE APPARATUS AND METHOD", which is a National Stage Entry of PCT/US2019/014806, filed Jan. 23, 2019, which claims benefit of U.S. Provisional Ser. No. 62/622,539, filed Jan. 26, 2018, the entire contents of which are herein incorporated by reference.

FIELD

The present disclosure relates to waste disposers such as food waste disposers and, more particularly, to baffles or splash guard components or features of such waste disposers, as well as methods of operating, assembling, manufacturing, fabricating, or implementing same.

BACKGROUND

In conventional food waste disposers, there is typically a baffle or splash guard across the throat opening. For example, in some food waste disposers, the throat baffle is inserted into the sink opening (strainer flange) and is removable by the user from the sink side. Also for example, in some other food waste disposers, the baffle is integrated with the mounting gasket and is only removable when the entire disposer is dismounted from the sink.

Depending upon the embodiment, the baffle of a food waste disposer can serve any of a variety of different purposes. For example, in at least some conventional embodiments, during disposer operation the baffle prevents splash back or particle ejection during grinding. Also for example, the baffle in many or most (if not all) conventional embodiments constitutes the primary user interface with the disposer, as the food waste must pass through the baffle, usually assisted by the operator, to enter the grind chamber. Further for example, the baffle, also in at least some conventional embodiments, prevents foreign objects such as silverware or sponges from entering the disposer both during operation and when not in use.

In at least some conventional embodiments, the baffle is made of nitrile rubber and has a pleated configuration. The pleats allow the baffle opening to enlarge as food waste is pushed through. The baffle however is also an obstacle to food waste entering the grind chamber. More particularly, in at least some disposers, the pleats of the baffle are stiff enough to hold a layer of water over the baffle opening(s) during the operation of the disposer while permitting an adequate flow of water for grinding. Such a design results in water coverage over the openings during operation, which attenuates the noise from the grind chamber, because the throat opening is typically the dominant path for the transmission of noise from the grind chamber to the user. One example of a baffle that is used to reduce the noise transmission via the throat opening path is described in U.S. Pat. No. 7,264,188, which issued on Sep. 4, 2007 and is entitled "Noise baffle for food waste disposer," the contents of which are hereby incorporated by reference herein.

Notwithstanding the effectiveness of certain conventional baffles in reducing noise during grinding, at least some such conventional baffles can have undesirable side-effects. For example, the presence of the baffles in sinks can result in the backing up of water into the sinks. In some cases, when water flows through a baffle into the grind chamber of a disposer, air inside the grind chamber is displaced and is vented up out of the grind chamber back through the baffle. Although there can be vent features or openings in the baffle that are intended to facilitate the venting out of the displaced air from the disposer, in some circumstances the flowing water obstructs the vent openings before the displaced air has been vented, which prevents or restricts the air from leaving the grind chamber. Consequently, an air bubble can develop under the baffle, and the air bubble that is formed under the baffle prevents the water from draining through the baffle and causes water to back up into the strainer flange and into the sink. Such operation can appear to indicate a clogged sink problem to a user, and cause concern for the user. Further, even though a user can readily remedy such operation by pushing down on the baffle pleats and displacing the trapped air (which can be colloquially referred to as "burping the baffle"), the user can find taking such action to be inconvenient or distasteful.

Also for example, the presence of a conventional baffle can make it undesirably difficult to get food waste into the grinding chamber of a disposer. In some cases, to achieve the desired passing of food into the grinding chamber, users will push food through the baffle with either their hands or various utensils or devices. However, users again can find taking such actions to be inconvenient or distasteful. Additionally, although other conventional baffles have pleats that may quickly sag when the baffles are in use, so as to create larger center openings and diminish the resistance posed by the baffles to food waste entering the disposers, food disposers employing such baffles can be viewed by some users as operating in a manner that is overly-aggressive in terms of the extent to which the disposers draw food into the grinding chambers of the disposers. Additionally, the presence of sagging baffles in some embodiments can also increase the probability of foreign objects entering the disposer.

In view of the above, it can be recognized that it is often desired that the throat baffles of disposers satisfy a variety of functional objectives substantially simultaneously. Indeed, it is often desired that a baffle operate to prevent material from leaving the grind chamber, that the baffle also allow appropriate material (food waste) to easily enter the grind chamber, that the baffle further make it more difficult for inappropriate material to enter the grind chamber, that the baffle attenuate noise, and that the baffle permit adequate water flow for grinding. Further, it can be appreciated that simultaneously satisfying these various functional objectives of throat baffles of disposers by way of a single baffle can be challenging, particularly insofar as several of these functional objectives tend to be in conflict with one another to a significant degree. As already discussed, although some conventional baffles are capable of providing significant noise attenuation, such conventional baffles can suffer from one or more side-effects resulting from design features that are provided to achieve such noise attenuation. Thus, with respect to at least some conventional baffles, users will complain that the baffles make it too difficult for food to pass into the grinding chambers, and yet be pleased with the reduced noise levels associated with the disposers during grinding operation.

Accordingly, it would be desirable if one or more improved baffles or disposer systems employing baffles, or improved methods of baffle or disposer system operation, assembly, manufacture, fabrication, or implementation, could be developed that overcame one or more of the above-described limitations associated with conventional baffles or disposer systems, or that achieved one or more other objectives relating to baffles or disposer systems employing baffles.

BRIEF SUMMARY

In at least some example embodiments, the present disclosure relates to a baffle for implementation in connection with a food waste disposer. The baffle includes a rim portion substantially circumferentially extending around a central axis of the baffle, and a plurality of flaps at least indirectly supported by the rim portion, where each of the flaps is substantially sector-shaped. Also, the baffle includes an annular portion connected or integrally formed with the rim portion, where the annular portion includes an outer surface configured to facilitate mounting of the baffle in relation to an external structure. Further, each of the flaps is at least indirectly supported in relation to the rim portion in a rotatable manner such that each of the flaps can rotate about a respective additional axis that is substantially tangent to a respective location along or proximate to the rim portion. Additionally, each of the flaps can be rotated so as to attain a respective closed position in which the respective flap extends radially inwardly, from a respective radially-outward portion of the flap positioned proximate to the respective location to a respective tip portion of the flap. When each of the flaps is respectively rotated so as to attain the respective closed position, the respective tip portions of the respective flaps collectively substantially define an inner orifice of the baffle through which the central axis passes. Further, the baffle includes one or more components that tend to cause the respective flaps to remain at the respective closed positions when already at the respective closed positions, and that tend to cause the respective flaps to return to the respective closed positions when not at the respective closed positions.

Additionally, in at least some example embodiments, the present disclosure relates to a baffle for implementation in connection with a food waste disposer. The baffle includes a rim portion substantially circumferentially extending around a central axis of the baffle, a plurality of flaps, and a plurality of living hinges, where the respective living hinges respectively link the respective flaps to the rim portion such that the rim portion, living hinges, and flaps constitute a single integrally-formed structure. Additionally, the respective living hinges permit the respective flaps to be rotatable about respective axes that respectively are substantially tangent to respective locations along or proximate to the rim portion, so that the respective flaps can be rotated to respective closed positions. Either the living hinges or at least one additional component tend to cause the respective flaps to remain at the respective closed positions when already at the respective closed positions, or to return to the respective closed positions when not at the respective closed positions.

Further, in at least some example embodiments, the present disclosure relates to a method of assembling a baffle that is for implementation in connection with a food waste disposer. The method includes providing a primary structure having a first structural portion and a ring structural portion, where the first structural portion includes a rim portion substantially circumferentially extending around a central axis of the baffle, a plurality of flaps, and a plurality of living hinges that together constitute a single integrally-formed silicone structure that is formed from a first material, and where the ring structural portion is connected with or integrally formed with the first structural portion. Additionally, the method includes overmolding a secondary structure on the primary structure, where the secondary structure is formed from a second material, and where the secondary structure includes a plurality of interlocking features that facilitate coupling of the secondary structure in relation to the primary structure. Either the living hinges or at least one additional component tend to cause the respective flaps to remain at the respective closed positions when already at the respective closed positions, or to return to the respective closed positions when not at the respective closed positions.

BRIEF DESCRIPTION OF THE DRAWINGS

Embodiments of food waste disposer throat baffles and related methods are disclosed with reference to the accompanying drawings and are for illustrative purposes only. The food waste disposer throat baffle apparatuses and methods encompassed herein are not limited in their applications to the details of construction, arrangements of components, or other aspects or features illustrated in the drawings, but rather such apparatuses and methods encompassed herein include other embodiments or are capable of being practiced or carried out in other various ways. Like reference numerals are used to indicate like components. In the drawings:

FIG. 16 is a component;

FIG. 23 is a bottom perspective view of a further food waste disposer throat baffle in accordance with a sixth embodiment encompassed herein;

FIG. 24 is a bottom perspective view of a subassembly of components of the baffle of FIG. 23;

FIG. 25 is a perspective view of a cutaway portion of a cross-section of the baffle of FIG. 23, taken when the baffle is in a non-inverted position, where a flap of the baffle is shown to be in a slightly-depressed position relative to the positions of the flaps shown in FIG. 23;

FIG. 26 is an additional perspective view of an additional cutaway portion of an additional cross-section of the baffle of FIG. 23, taken when the baffle is in an inverted position, and also when the flap of the baffle particularly shown in FIG. 26 takes on an elevated position relative to the positions of the flaps shown in FIG. 23.

DETAILED DESCRIPTION

The present disclosure is intended to encompass any of a variety of baffles, food disposer systems employing such baffles, or methods of baffle or food waste disposer system operation, assembly, manufacture, fabrication, or implementation. In at least some such embodiments, the baffles can be considered active baffles insofar as the baffles have flaps (rather than pleats) and one or more components or features that tend to cause the flaps to maintain closed positions or return to closed positions when not at closed positions. In at least some such embodiments, the one or more components or features can include living hinges by which the flaps are linked to an outer support portion of the baffle such as a rim portion or support ring structural portion, such that the flaps, living hinges and outer support portion are integrally formed. In at least some other embodiments, the one or more components or features can include an elastic band. Given such a configuration, the flaps tend to remain in closed positions so as to enhance sound reduction during food waste disposer system operation, but also still permit food waste to be inserted into the food waste disposer system through the baffle with relative ease and permit appropriate levels of water passage through the baffle so as to diminish occurrences in which it appears that a drain may be clogged. Indeed, with such a configuration, food waste can also fall into the food waste disposer through the baffle if the weight of that food waste is enough to cause one or more of the baffle flaps to open.

Figure 1:
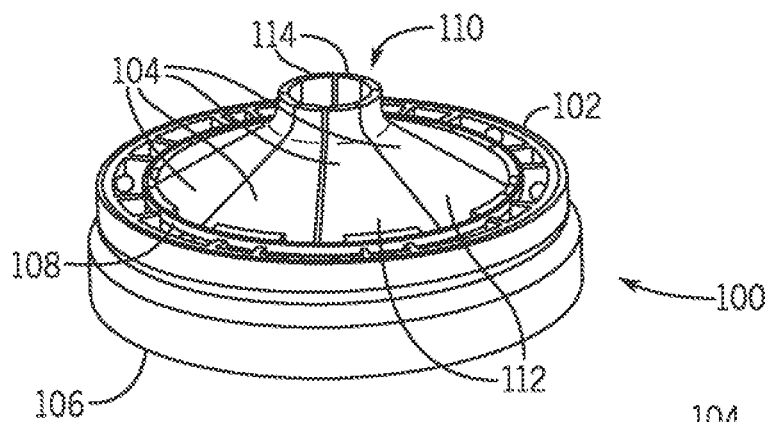
FIG. 1 is a bottom perspective view of a food waste disposer throat baffle in accordance with a first embodiment encompassed herein.

Referring to FIG. 1, a bottom perspective view is provided of a first baffle system or simply baffle 100 that can be employed as part of (or in conjunction with) a food waste disposer or similar disposer mechanism, in accordance with a first example embodiment encompassed herein. The bottom perspective view of the baffle 100 of FIG. 1 shows in relative completeness most or substantially all of the component parts of the baffle. In particular, it can be appreciated from FIG. 1 that the baffle 100 includes an annular manifold (or ring or rim portion) 102, a plurality of flaps 104 (in this example embodiment, eight of the flaps are present), an annular elastomer gasket 106, and an elastic band 108.

As will be described in further detail below, the flaps 104 are attached at the base to circumferential features (e.g., at the annular manifold 102), and the elastic band 108 serves to hold the flaps closed but allows them to open with slight pressure, making it easier to get food waste through the baffle. The annular manifold 102, flaps 104, annular elastomer gasket 106, and elastic band 108 can be made from any of a variety of materials depending upon the embodiment. In some example embodiments, the flaps 104 can be made from polypropylene or nylon, and the annular manifold 102 can be made from nitrile rubber or a thermoplastic elastomer (TPE). Also, the annular elastomer gasket 106 and the elastic band 108 can be made from one or more of rubber, TPE, and/or one or more other elastomeric or flexible materials, depending upon the embodiment.

As is evident from FIG. 1, the flaps 104 are generally in the form of sectors and extend from the annular manifold 102 radially inwardly toward a central orifice 110 of the baffle 100. Further, each of the flaps 104 has a respective main flat surface portion 112 that extends radially inwardly substantially from the annular manifold 102 to the central orifice 110, and each of the flaps additionally includes a respective tip portion 114 that extends along the inner orifice in a direction that approaches being perpendicular to the respective main flat surface portion of the respective flap. As will be described further below, each of the flaps 104 is capable of being rotated downward or upward relative to the annular manifold 102 (when the annular manifold is oriented to be along a substantially horizontal plane), but FIG. 1 particularly shows all of the flaps in horizontal, or largely-horizontal, positions. When positioned in this horizontal or largely-horizontal manner as shown in FIG. 1, the flaps 104 can be said to be in their closed positions. It should be appreciated from FIG. 1 that the central orifice 110 is substantially defined in its outer perimeter by the combination of the tip portions 114 of the flaps 104, particularly when the flaps 104 are in their closed positions. It should additionally be appreciated from FIG. 1 that, although the closed positions of the flaps 104 for simplicity are characterized above as being horizontal or largely-horizontal positions, in actuality the flaps 104 even when in their closed positions do typically have a somewhat downwardly-sloping profile—that is, each of the flaps 104 (and each of the main flat surface portions 112 thereof) does have some degree of downward slope as one proceeds radially inwardly from the annular manifold 102 toward the central orifice 110. Further in this regard, because FIG. 1 is a bottom perspective view of the baffle 100 that shows the baffle in a position that is substantially inverted relative to the position it would have when normally installed in a food waste disposer, the sloping of the flaps 104 that is illustrated in FIG. 1 is the opposite of that described above—that is, the flaps 104 are illustrated in FIG. 1 to have some degree of upward slope as one proceeds radially inwardly from the annular manifold 102 toward the central orifice 110.

Figure 2:
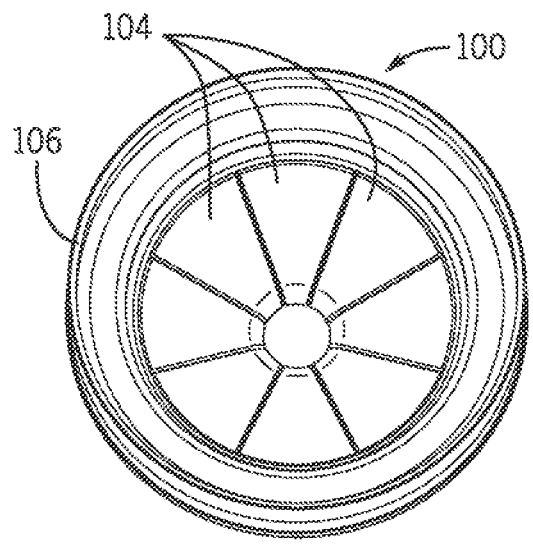
FIG. 2 is a top perspective view of the baffle of FIG. 1.

Referring additionally to FIG. 2, a top perspective view of the baffle 100 is provided to supplement the view provided in FIG. 1. In contrast to the view provided by FIG. 1, the top perspective view of FIG. 2 does not allow for all of the components of the baffle 100 to be visible. More particularly, FIG. 2 specifically reveals only the flaps 104 leading up to the central orifice 110 of the baffle 100, as well as the annular elastomer gasket 106.

Figure 3:
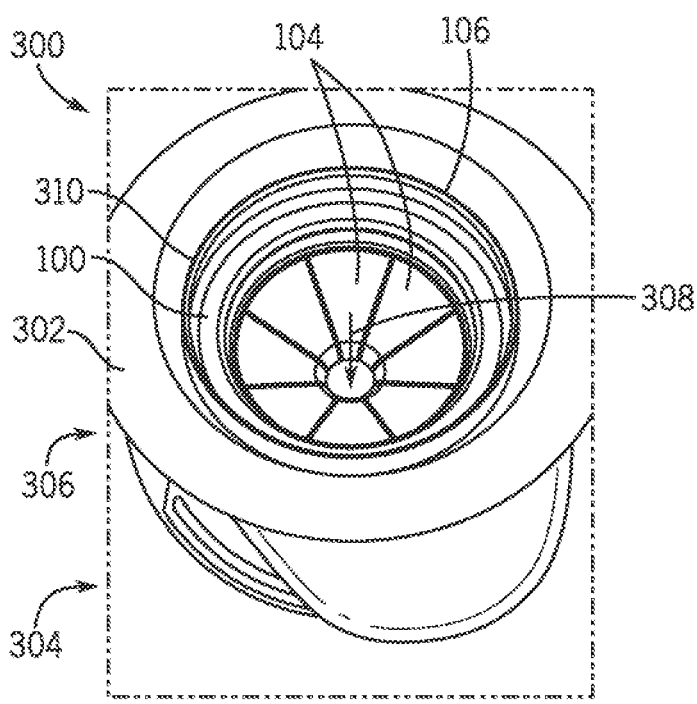
FIG. 3 is an additional top perspective view of the baffle of FIG. 1, shown in combination with other portions of a food waste disposer of which the baffle forms a part, as well as a strainer flange (typically part of a sink) in which the food waste disposer is mounted, shown in cutaway.

Referring additionally to FIG. 3, a further top perspective view of the baffle 100 is provided in which the baffle is shown to be implemented as part of a food waste disposer and a portion of a sink with respect to which the food waste disposer is mounted. More particularly in this regard, FIG. 3 illustrates a top perspective view of a combination system 300 that includes a strainer flange 302 and portions 304 of a food waste disposer 306, in addition to the baffle 100. It should be appreciated that the baffle 100 and the portions 304 can all be considered to be encompassed by the food waste disposer 306. Additionally, in some embodiments the strainer flange 302 can also be considered to be encompassed by the food waste disposer 306—for example, the strainer flange 302 can be considered to be another portion of the food waste disposer 306 in addition to the portions 304. Further for example in this regard, the strainer flange 302 can be a part of a food waste disposer mounting assembly that is installed in the sink and retained in position by other components of the disposer mounting assembly. However, in other embodiments the strainer flange 302 can be considered to be part of (e.g., an integral part of) a sink that is distinct from the food waste disposer. For purposes of the present disclosure, therefore, the illustration of the strainer flange 302 in FIG. 3 relative to the portions 304 can be understood to be representative of the presence of a sink in relation to a food waste disposer.

The view provided by FIG. 3 is a view that is largely consistent with the view that a user of the food waste disposer 306 would have of the food waste disposer and the baffle 100 thereof when using the food waste disposer. At the same time, it should also be appreciated that the portions 304 of the food waste disposer 306 that are visible in FIG. 3 (not including the baffle 100 itself) are those portions of the food waste disposer that are typically beneath the baffle 100, including the portions that define the grinding chamber of the food waste disposer. Given that the baffle 100 typically is mounted at or proximate to the bottom level of a sink in relation to which the food waste disposer 306 is mounted, the portions 304 of the food waste disposer 306 are typically beneath the sink, and consequently (notwithstanding what is shown in FIG. 3) the portions 304 of the food waste disposer 306 are not typically visible during normal use of the food waste disposer.

It will be appreciated that the combination system 300 during operation of the food waste disposer 306 involves directing food waste or other waste downward toward and through the central orifice 110 generally in a direction indicated by an arrow 308. The arrow 308 can be understood to be (or correspond to) a central axis of the baffle 100 that is perpendicular to a plane defined by the annular manifold 102 shown in FIG. 1, as well as perpendicular to a plane defined by an upper annular lip 310 of the annular elastomer gasket 106. It should further be apparent from a comparison of FIG. 1 and FIG. 3 that the tip portions 114 of the baffle 100 generally extend in directions that are parallel to the direction of the arrow 308. Also, it should be appreciated from a comparison of FIG. 1 and FIG. 3 that, to the extent that the flaps 104 have a downward sloping profile even when in their closed (or horizontal or largely-horizontal) positions as described above, the downward slope of each of the flaps 104 is in the direction of the arrow 308 (that is, downward into the food waste disposer 306) as one proceeds radially inwardly from the annular manifold 102 toward the central orifice 110.

Figure 4:
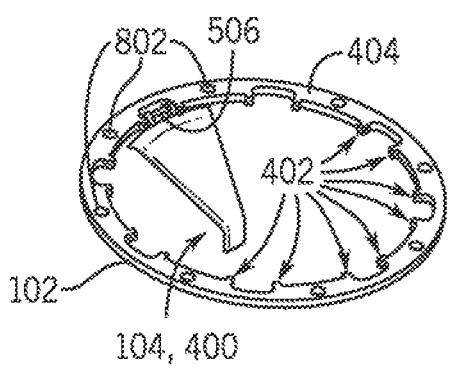
FIG. 4 is a top perspective view of a combination of an annular manifold and a flap that are components of the baffle of FIG. 1.
Figure 5:
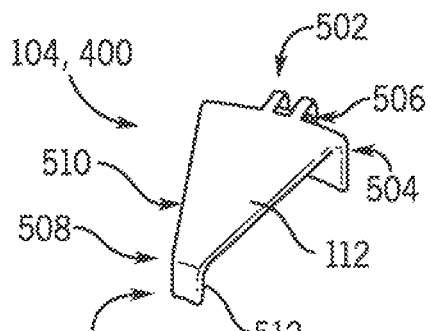
FIG. 5 provides an additional top perspective view of the flap of FIG. 4, shown apart from the annular manifold of FIG. 4.
Figure 6:
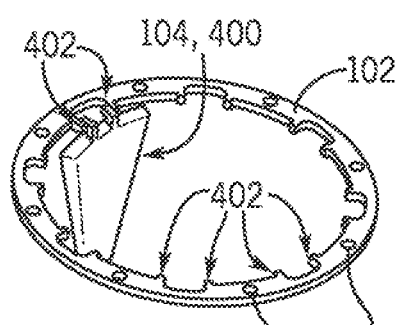
FIG. 6 is an additional top perspective view of the combination of the annular manifold and the flap of FIG. 4 in which the flap is rotated further downward relative to the annular manifold by comparison with the position of the flap relative to the annular manifold in FIG. 4.
Figure 7:
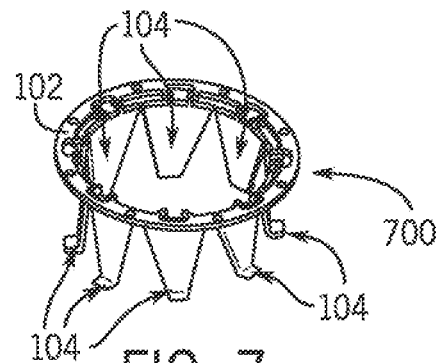
FIG. 7 is a further top perspective view of a combination of the annular manifold and all of the flaps that are components of the baffle of FIG. 1.

Turning now to FIG. 4, FIG. 5, FIG. 6, FIG. 7, FIG. 8, FIG. 9, FIG. 10, FIG. 11, and FIG. 12, various components and groupings of the components of the baffle 100 are shown in more detail, to illustrate additional features of those components, as well as to illustrate a process of assembly of the baffle 100. First, FIG. 4, FIG. 6, and FIG. 7 are provided to illustrate a first step of assembly of the baffle 100 in which the flaps 104 are assembled to the annular manifold 102. FIG. 5 additionally provides a perspective view of a first one 400 of the flaps 104, including features that allow for the flap to be coupled to the annular manifold 102. In the present embodiment, each of the features of the first one 400 of the flaps 104 of FIG. 5 is also present in each of the other flaps 104 of the baffle 100, albeit in other embodiments different ones of flaps can have different features relative to one another. Further, FIG. 8, FIG. 9, FIG. 10, and FIG. 11 illustrate other steps of the process of assembly of the baffle 100, or features of the baffle 100 or components thereof that facilitate the assembly process.

Referring to FIG. 5, as represented by the first one 400 of the flaps 104 shown therein, each of the flaps 104 includes several features of note. First, each of the flaps 104 includes a respective extension portion 502 that is formed as a respective integral extension of a respective outer diameter edge 504 of that flap. Additionally, each of the extension portions 502 of the respective flaps 104 (including the extension portion of the first one 400 of the flaps shown in FIG. 5) includes a respective pair of integrated pins 506. The two respective pins of each of the respective pairs of integrated pins 506 of the respective flaps 104 (including the first one 400 of the flaps shown in FIG. 5) generally extend in directions opposite from one another along a respective axis that is parallel to a respective tangent line defined by the respective outer diameter edge 504 of the respective flap.

Additionally as illustrated by FIG. 5, each of the flaps 104 also includes a respective curved transition region 508 that links the respective tip portion 114 of the respective flap with the respective main flat surface portion 112 of the respective flap. Further, each of the flaps 104 has a respective first side edge 510 and a respective second side edge 512, both of which extend from the respective outer diameter edge 504 to the respective tip portion 114 of the respective flap (along the opposite sides of the respective flap). In the present embodiment, each of the first and second side edges 510, 512 of each of the flaps 104 is generally rounded or curved. Additionally, each of the tip portions 114 of the respective flaps 104 is elongated. Although the lengths of the tip portions of the flaps can vary depending upon the embodiment, in the present embodiment the length of each of the tip portions 114 can be, for example, up to 3 millimeters. Given the shape of the tip portions 114 of the flaps 104, when the flaps 104 are in their horizontal or largely-horizontal positions as shown in FIG. 1, the tip portions 114 generally extend in the direction of the arrow 308 shown in FIG. 3 (and FIG. 8).

Referring now to FIG. 4, it should be appreciated that the respective integrated pins 506 of the respective flaps 104 as shown in FIG. 5 allow for the respective flaps to be assembled to the annular member 102. More particularly, FIG. 4 shows that the annular manifold 102 includes multiple (in this example, eight) pairs of slots 402. Further, based upon a comparison of FIG. 5 with FIG. 4, it will be understood that the respective pins of the pair of integrated pins 506 of the first one 400 of the flaps 104 can be press fit into the respective slots of any of the pairs of slots 402 of the annular manifold 102. The integrated pins 506 (of the pair of integrated pins) particularly enter the corresponding slots 402 by proceeding downward through a top surface 404 of the annular manifold 102 and into the slots. Likewise, it should be appreciated that the respective integrated pins of each of the other pairs of integrated pins 506 of the other ones of the flaps 104 can be press fit into the respective slots of respective other ones of the pairs of slots 402 of the annular manifold 102. That is, the process of assembling each and every one of the flaps 104 onto the annular manifold 102 involves press fitting the respective pins of the respective pair of integrated pins 506 of the respective flap into counterpart ones of a respective pair of slots 402 on the annular manifold 102.

FIG. 4 particularly shows the first one 400 of the flaps as extending radially inwardly toward the center of the annular manifold 102, in a manner such that the flap extends in a manner that is largely within or parallel to a plane defined by the annular manifold 102. However, it should be understood that in the present embodiment the integrated pins 506 of each of the flaps 104 such as the first one 400 of the flaps are configured to fit loosely within the counterpart ones of the slots 402 of the annular manifold 102. Consequently, assuming that the plane defined by the annular manifold 102 is substantially horizontally-orientated, after the integrated pins 506 of the first one 400 of the flaps 104 are press fit into the counterpart ones of the slots 402 of the annular manifold 102, the flap will tend to hang down vertically due to gravity acting upon the flap, as illustrated by FIG. 6.

Further, referring to FIG. 7, upon the assembly of all of the flaps 104 (in this example, all eight flaps) so that the respective integrated pins 506 of each respective flap are pressed fit into the respective slots 402 of the annular manifold 102, then an overall subassembly 700 including the annular manifold and all of the flaps is achieved as shown in FIG. 7. In the present embodiment, consistent with the description provided regarding FIG. 6, the integrated pins 506 of each of the flaps 104 are configured to loosely fit within the slots 402 and consequently (assuming that the annular manifold 102 is positioned so that a plane defined thereby is horizontal relative to the ground) all of the flaps 104 are shown to hang loosely downward in FIG. 7.

Therefore, in view of FIG. 4, FIG. 5, FIG. 6, and FIG. 7, it should be appreciated that the first step of assembly of the baffle 100 involves repeatedly press fitting each of the flaps 104 onto the annular manifold 102 so that all of the flaps 104 are supported by the annular manifold. Further, due to the interaction between the integrated pins 506 and the slots 402, this step of assembly results in the subassembly 700 in which the respective flaps can be easily rotated relative to the annular member. Each of the respective flaps 104 particularly is rotatable about a respective axis that is determined by the interaction of the respective integrated pins 506 of the respective flap with the counterpart ones of the slots 402 of the annular manifold 102 into which those respective pins have been situated (e.g., where the respective axis coincides with a respective center axis of the respective pair of integrated pins), where the respective axis is parallel to a respective tangent line defined by the respective outer diameter edge 504 of the respective flap (as discussed above in regard to FIG. 4 and FIG. 5).

Figure 8:
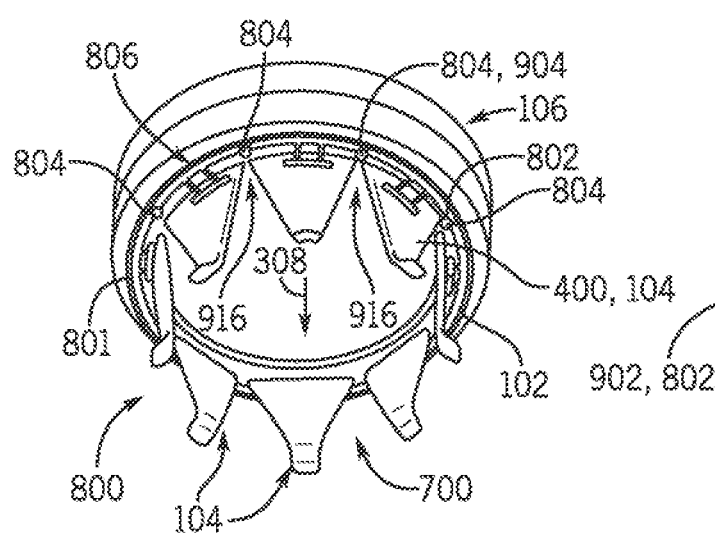
FIG. 8 is a bottom perspective view of an annular elastomer gasket in combination with the combination of the annular manifold and flaps of FIG. 7, all of which are components of the baffle of FIG. 1.
Figure 9:
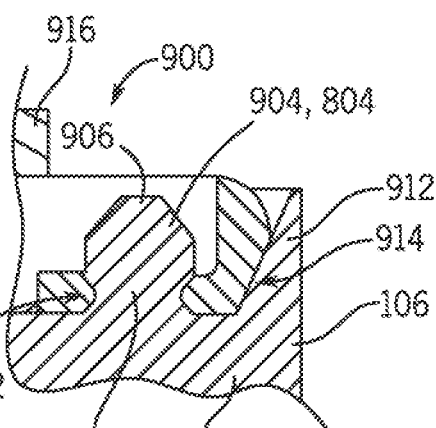
FIG. 9 shows a cutaway cross sectional view of a first portion of the annular manifold and an additional portion of the annular elastomer gasket shown in FIG. 8.
Figure 10:
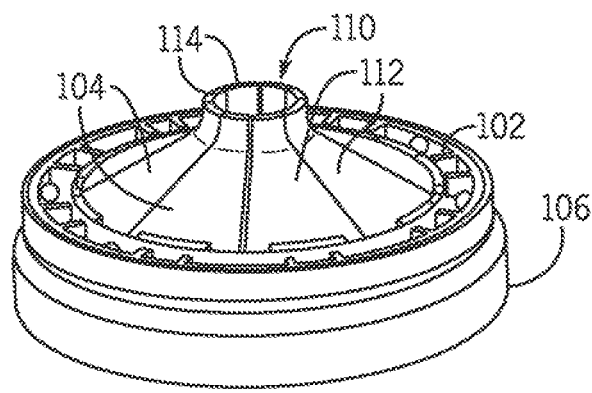
FIG. 10 is a bottom perspective view of the components of the food waste disposer throat baffle that are shown in FIG. 8.

Turning to FIG. 8, FIG. 9, and FIG. 10, a second step of assembly of the baffle 100 involves assembling the annular elastomer gasket 106 around and in relation to the subassembly 700 of FIG. 7. FIG. 8 particularly provides a bottom perspective view of the annular elastomer gasket 106 after it has been placed around and in relation to the subassembly 700 including the annular manifold 102 and the flaps 104, with the flaps all extending downward in the same manner as shown in FIG. 7. FIG. 8 therefore shows a further subassembly 800 including all of those components, that is, all of the annular elastomer gasket 106, the annular manifold 102, and all of the flaps 104. The manner in which an elastomer gasket, such as the annular elastomer gasket 106, can be assembled to another structure such as the subassembly 700 can vary depending upon the embodiment, and one example manner of assembly is described further below.

More particularly, in the present embodiment, it will be appreciated from FIG. 4 as well as FIG. 8 that the annular manifold 102 includes a plurality of (in this example, eight) elliptical holes 802 that are spaced equidistantly around the circumference of the annular manifold, where the respective elliptical holes are positioned between respective pairs of neighboring ones of the slots 402, respectively. Each of the elliptical holes 802 extends through the annular manifold 102 from the top surface 404 (see FIG. 4) of the annular manifold to a bottom surface 801 of the annular manifold (see FIG. 8). Correspondingly, the annular elastomer gasket 106 includes a plurality of (in this example, also eight) elastomer (for example, rubber) protrusions or spigots 804 that are spaced around the circumference of a bottom annular surface 806 of the annular elastomer gasket 106 that interfaces the top surface 404 (see FIG. 4) of the annular manifold 102 when the annular elastomer gasket is assembled to the annular manifold.

Given the presence of the elliptical holes 802 and the spigots 804, the annular elastomer gasket 106 more particularly is assembled in relation to the annular manifold 102 by aligning the spigots 804 of the annular elastomer gasket in relation to the elliptical holes 802 of the annular manifold 102 and then pressing the annular elastomer gasket 106 toward the annular manifold 102 so that the bottom annular surface 806 of the annular elastomer gasket interfaces the top surface 404 (see FIG. 4) of the annular manifold. In FIG. 8, the annular elastomer gasket 106 particularly is pressed in relation to the annular manifold 102 in the direction represented by the arrow 308 (as also shown in FIG. 3) so that the respective spigots 804 enter into and pass through the respective elliptical holes 802. Given that the annular elastomer gasket 106 is malleable to some degree, this process typically involves pressing the annular elastomer gasket relative to the annular manifold 102 locally, at or near each of the spigots 804, so that each one of the spigots is pressed into and through a corresponding one of the elliptical holes 802.

Referring additionally to FIG. 9, a cutaway cross sectional view is provided of a first portion of the annular manifold 102 and an additional portion of the annular elastomer gasket 106 to illustrate in more detail the manner in which the annular elastomer gasket 106 is assembled in relation to the annular manifold 102 by way of the spigots 804 and the elliptical holes 802. More particularly, it will be appreciated that FIG. 9 shows a cross section of a first one 904 of the spigots 804 that is positioned within a first one 902 of the elliptical holes 802. As shown further, the first one 904 of the spigots 804 has, as does each of the other spigots 804, a tip portion 906 that is larger in diameter than a neck portion 908 extending between the tip portion and a main annular body 910 of the annular elastomer gasket 106. The diameter of the neck portion 908 is generally about the same size as the narrowest diameter of the elliptical holes 802, and the diameter of the tip portion 906 is larger than the narrowest diameter of the elliptical holes.

Consequently, although the malleability of the annular elastomer gasket 106 allows for the spigots 804, such as the first one 904, to pass through the elliptical holes 802, such as the first one 902, once a tip portion of a spigot, such as the tip portion 906 of the first one 904 has passed through a respective elliptical hole such as the first one 902, then that spigot tends to be substantially locked into position relative to the annular manifold 102. Thus, with all of the spigots 804 positioned respectively through all of the corresponding elliptical holes 802, respectively, there is strong resistance to disassembly of the annular elastomer gasket 106 from the annular manifold 102, albeit strong efforts to pull the annular elastomer gasket 106 away from the annular manifold 102 will result in such disassembly.

In addition to these features shown in FIG. 9, it should also be pointed out that, as illustrated therein, the annular elastomer gasket 106 includes an outer perimeter wall 912. As shown, when the annular elastomer gasket 106 is assembled to the annular manifold 102, the outer perimeter wall 912 overhangs and extends around an outer circumferential perimeter 914 of the annular manifold 102. Also, the annular elastomer gasket 106 further includes inner lip portions 916 (see also FIG. 8) that extend around and past an inwardly-facing edge of the annular manifold 102 so as to extend around and apply pressure upon the annular manifold at both the top surface 404 and the bottom surface 801 of the annular manifold. Therefore, the interactions between the inner lip portions 916 and the annular manifold 102 supplement the interactions between the spigots 804 and elliptical holes 802 in terms of attaching the annular elastomer gasket 106 to the annular manifold 102.

It is envisioned, with respect to the assembly of the flaps 104 in relation to the annular manifold 102 and additionally with respect to the assembly of the annular elastomer gasket 106 to the subassembly 700 (including the flaps 104 and annular manifold 102), that these assembly steps can be performed easily with these components being positioned substantially in a "right-side up" manner. That is, as described above, during the performing of these steps, the annular manifold 102 is positioned horizontally so that the top surface 404 faces upward. With such positioning of the annular manifold 102, the slots 402 are positioned to receive the integrated pins 506 by pressing the integrated pins downward into the slots 402, and the annular elastomer gasket 106 is attached to the annular manifold 102 by pressing the annular elastomer gasket down onto the top surface 404 of the annular manifold 102. With assembly in this manner, the flaps 104 tend to take a hanging posture relative to the annular manifold 102 and the annular elastomer gasket 106, as shown in FIG. 7 and FIG. 8.

Nevertheless, to complete assembly of the baffle 100, as shown in FIG. 10, it is most convenient at this juncture in the assembly process to invert the further subassembly 800 of FIG. 8 so that all of the flaps 104 revert to a closed status, that is, such that all of the flaps no longer hang downward but rather have become repositioned so that all of the tip portions 114 of the flaps 104 approach one another so as to define the central orifice 110. As illustrated, when the flaps 104 are positioned in this manner, the main flat surface portions 112 of the flaps generally extend radially inward toward the central orifice 110, in a largely (but not strictly) horizontal manner. More particularly, when the further subassembly 800 is inverted as shown in FIG. 8, the main flat surface portions 112 extend largely horizontally but also have a slight incline as those portions extend radially inwardly toward the central orifice 110. Correspondingly, if the further subassembly 800 was positioned right-side-up, the main flat surface portions 112, when positioned relative to the remainder of the further subassembly 800 as shown in FIG. 10, would have a slight decline as those portions extended radially inwardly toward the central orifice 110.

Figure 11:
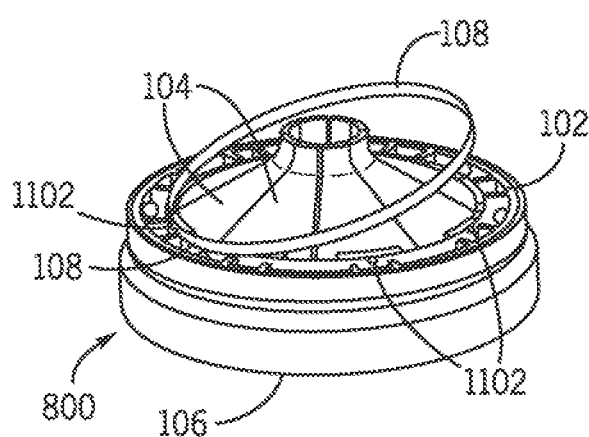
FIG. 11 is a bottom perspective view of all of the components of the baffle of FIG. 1 in which an elastic band component is in the process of being assembled to (or disassembled from) the components of the baffle shown in FIG. 10.

With the flaps 104 positioned as shown in FIG. 10, then the elastic band 108 can be positioned in relation to the further subassembly 800 as illustrated by FIG. 11. More particularly, the elastic band 108 is assembled to the further subassembly 800 by placing the band under respective retaining ribs 1102 of the respective flaps 104. In FIG. 11, the elastic band 108 is displayed as being first positioned under only one (e.g., a first one) of the retaining ribs 1102. Nevertheless, it should be appreciated that, to complete the assembly of the elastic band 108 in relation to the further subassembly 800 and arrive at the baffle 100 of FIG. 1, the elastic band then additionally is placed under each and every other one of the (in this example, each and every one of the remaining seven) retaining ribs 1102 associated with each of the remaining ones of the flaps 104. Although the elastic band can be implemented by hand, the elastic band can also be positioned using a toothpick or other tool. It is recommended to avoid twists in the elastic band when implementing the elastic band.

Figure 12:
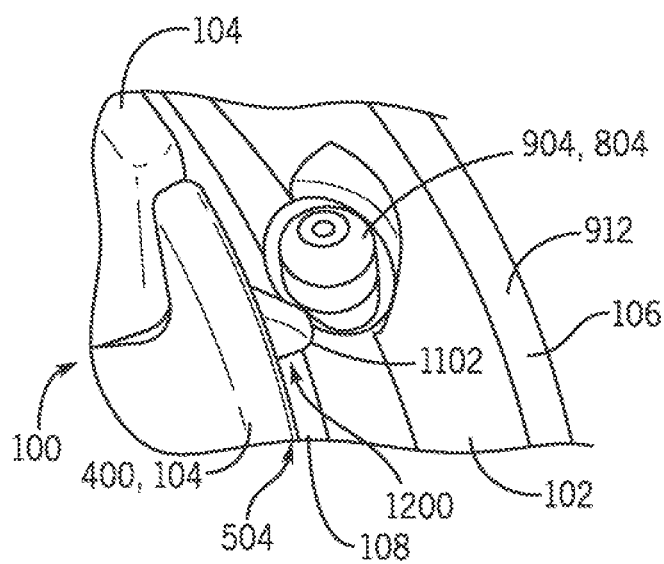
FIG. 12 shows a cutaway bottom perspective view of a portion of the baffle of FIG. 1.

Further with respect to the assembly of the elastic band 108 onto the further subassembly 800, FIG. 12 shows a cutaway perspective view of a portion of the baffle 100 after the elastic band has been fully implemented as part of the baffle. FIG. 12 particularly illustrates how the retaining rib 1102 of the first one 400 of the flaps 104 takes the form of a triangularly-shaped protrusion that extends radially outward from the outer diameter edge 504 of that flap and that includes a support surface 1200. It will be appreciated that all of the other retaining ribs 1102 of the others of the flaps 104 not shown in FIG. 12 also take this form. Accordingly, when the baffle 100 is positioned in the right-side up manner such that the top surface 404 of the annular manifold 102 faces upward, the elastic band 108 rests upon all of the support surfaces 1200 of the retaining ribs 1102 of the flaps 104 and is positioned in between those support surfaces 1200 and the annular manifold 102.

Once the step of assembling the elastic band 108 onto the further subassembly 800 is completed, the process of assembling the baffle 100 is completed. With the baffle 100 in this completed state, the elastic band 108 extends generally along the entire circumference of the annular manifold 102 and around all of the retaining ribs 1102 of all of the flaps 104. In this position, the elastic band 108 tends to provide a radially-inwardly-directed compressive force upon all of the outer diameter edges 504 of all of the flaps 104 tending to cause all of the flaps to take on their positions relative to the annular manifold 102 as shown in FIG. 1. That is, the elastic band 108 tends to cause all of the flaps 104 to take on their horizontal or largely-horizontal (and radially-inwardly-extending), or closed, positions such that the tip portions 114 of the flaps substantially define the central orifice 110.

Further, when the baffle 100 is positioned right-side-up (opposite to the position shown in FIG. 1), the elastic band 108 provides a return force upon all of the flaps 104 that tends to bring all of the flaps to their closed positions, rather than allowing any of the flaps to remain in a hanging position as shown in FIG. 7/FIG. 8.

Baffles having features that are in accordance with, or substantially or largely in accordance with, the baffle 100 described above in regard to FIG. 1 through FIG. 12 may, depending upon the exact embodiment exhibit one or more advantages by comparison with one or more conventional baffles. For example, the baffle 100 is designed so that it can fit into a strainer flange such as the strainer flange 302 of FIG. 3 in a manner that is identical to or similar to the manner in which at least some conventional baffles engage a strainer flange. Thus, the baffle 100 would be removable from a sink opening to leave the full drain opening accessible to a user for cleaning purposes or to allow for the clearing of jammed material from the grind chamber of a food waste disposer, such as the food waste disposer 306.

Further for example, as described above, the flaps 104 of the baffle can be made from a material such as polypropylene or nylon that is rigid by comparison with some other materials that are used for flaps in one or more conventional baffles. Additionally, given the shape of the flaps 104 that include the elongated tip portions 114, it is easier for a user who has inserted the user's hand or fingers through the central orifice 110 (e.g., to push food material through the central orifice 110 into the food waste disposer 306) to subsequently remove the user's hand or fingers from the central orifice 110 and away from the food waste disposer 306 than is the case with one or more conventional baffles. That is, in the case of one or more conventional baffles that have flaps (rather than pleated configurations), as a user withdraws the user's hand from the baffle, the flap tips tend to trap or pinch on the user's hand making it difficult to withdraw the hand. By comparison, the baffle 100 can be viewed as a baffle design that may minimize or reduce finger-trapping that can occur.

Additionally for example, although one or more conventional baffles employed with food waste disposers are molded as a single part, the baffle 100 is not molded as a single part—instead, the baffle 100 has the flaps 104 that are distinct from and are assembled to the annular manifold 102, and additionally has the elastic band 108 that is assembled around the flaps 104 (also, the annular elastomer gasket 106 is assembled to the annular manifold). Given that the annular manifold 102, the flaps 104, and the elastic band 108 are distinct components, the stiffness (or elasticity) of the elastic band may be set or selected in a manner that takes into account or balances characteristics of interest of the flaps. Further for example in this regard, the stiffness of the elastic band 108 may be set or selected to balance the resistance of the flaps 104 to water flow with the ease of food waste passing through the baffle 100.

Because the baffle 100 employs the elastic band 108, which tends to move the flaps 104 to their horizontal or largely-horizontal (or closed) positions, the baffle may be considered an active baffle design, rather than a passive baffle design. As an active baffle design, the baffle 100 also may provide any of a variety of further advantages (e.g., in addition to or instead of any of those mentioned above) by comparison with one or more conventional passive baffle designs including, further for example, enhanced sound reduction, increased ease of food waste insertion, and improved, appropriate, water draining, regardless of the water flow characteristics of the installation.

Additionally, although it is possible for all of the flaps 104 of the baffle 100 to move in unison, it is also possible for any of the flaps to move individually, or for two or more of the flaps to move while one or more others of the flaps do not move, or for different one(s) of the flaps to move to different degrees than other one(s) of the flaps. This is to be contrasted with one or more conventional pleated baffle designs. In such conventional baffles, the pleats of the baffle all are interconnected and move together, such that the combined stiffness of all of the pleats may be too high for the pleats to be displaced and allow water to flow through the baffle properly under certain water flow conditions. By comparison, the baffle 100 may operate in a manner such that, in some operational circumstances, only a subset of the flaps 104 (e.g., as few as one or two of the flaps 104) is or are displaced in response to water flow, while the remaining ones of the flaps is or are not displaced, thereby facilitating water flow.

Figure 13:
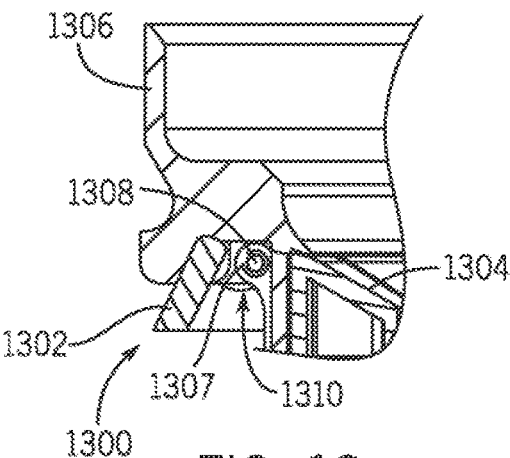
FIG. 13 shows a cross sectional view of a portion of a food waste disposer throat baffle differing from that of FIG. 1, in accordance with a second embodiment encompassed herein.
Figure 14:
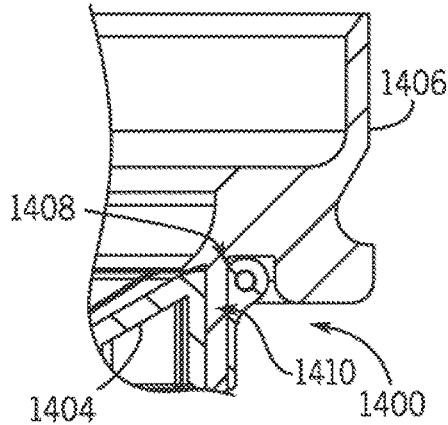
FIG. 14 shows a cross sectional view of a portion of a food waste disposer throat baffle differing from that of FIG. 1, in accordance with a second embodiment encompassed herein.

Notwithstanding the description provided above regarding the elastic band 108, in other embodiments other components or features can be employed to apply pressure tending to return the flaps 104 to a horizontal position. FIG. 13 and FIG. 14 particularly show cutaway cross sectional views of two alternate embodiments of the baffle 100, namely, a first alternate baffle 1300 and a second alternate baffle 1400, in which an elastic band is absent and instead other mechanisms are employed to cause the flaps of the baffles to return to a horizontal state.

Particularly with regard to the embodiment of FIG. 13, the first alternate baffle 1300 includes an annular manifold 1302, a plurality of flaps 1304 (one of which is shown), and an annular elastomer gasket 1306, which respectively correspond to the annular manifold 102, the flaps 104, and the annular elastomer gasket 106, respectively, of the baffle 100. However, in the embodiment of FIG. 13, rather than employing an elastic band corresponding to the elastic band 108, instead each of the flaps 1304 is rotatably coupled to the annular manifold 1302 by way of a respective rotation pin 1308 (one of which is shown in FIG. 13). In addition, respective torsion springs 1307 (again one of which is shown in FIG. 13) are respectively positioned around the respective rotation pins 1308 associated with the respective flaps 1304, and are respectively fixed in place by way of respective machine screws 1310. The respective torsion springs 1307 are configured, relative to the respective flaps 1304, so that the respective torsion springs tend to be deformed when the respective flaps begin to sag or rotate downward. Thus, the respective torsion springs 1307 tend to force the respective flaps 1304 to return to a horizontal or largely-horizontal (or closed) state when the respective flaps sag or rotate downward.

As for the embodiment of FIG. 14, the second alternate baffle 1400 also includes a plurality of flaps 1404 (one of which is shown), and an annular elastomer gasket 1406, which respectively correspond to the flaps 104 and the annular elastomer gasket 106, respectively, of the baffle 100. In contrast with the embodiment of FIG. 13, in the embodiment of FIG. 14 there is no distinct annular manifold but rather all of the flaps 1404 are directly hinged relative to the annular elastomer gasket 1406 itself. Further, instead of utilizing the elastic band 108 or torsion springs 1307, it is the annular elastomer gasket 1406 itself that provides the force that tends to cause the flaps 1404 to return to their closed state.

In order to achieve such operation, each of the flaps 1404 includes a respective slot 1408 (one of which is shown in FIG. 14), and additionally the annular elastomer gasket 1406 includes a plurality of elastomer (e.g., rubber or TPE) fingers or flaps 1410 (one of which is shown in FIG. 14), where the number of the elastomer fingers 1410 equals the number of the slots 1408. As illustrated by FIG. 14, which shows one of the elastomer fingers 1410 extending into one of the slots 1408, the respective elastomer fingers 1410 respectively extend into the respective slots 1408 when the respective flaps 1404 are assembled to the annular elastomer gasket 1406. Given this arrangement, when the respective flaps 1404 sag or hang downward, the respective elastomer fingers 1410 become bent or distended and tend to provide a restoring force causing the respective flaps 1404 to return to a horizontal or largely-horizontal (or closed) state. Thus, the elastomer fingers (or flaps) 1410 of FIG. 14 act as springs and can be referred to as living springs or elastomeric hinges.

Figure 15:
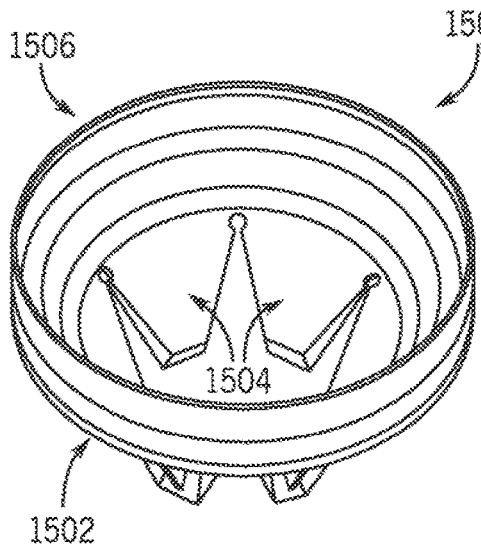
FIG. 15 shows a top perspective view of a combination gasket that is a component of a fourth embodiment of food waste disposer throat baffle differing from that of FIG. 1 and encompassed herein.
Figure 16:
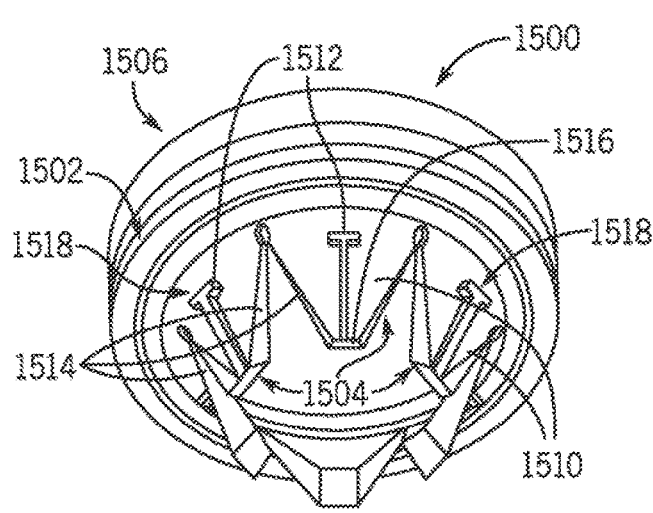
FIG. 16 shows a bottom perspective view of the combination gasket of FIG. 15.
Figure 17:
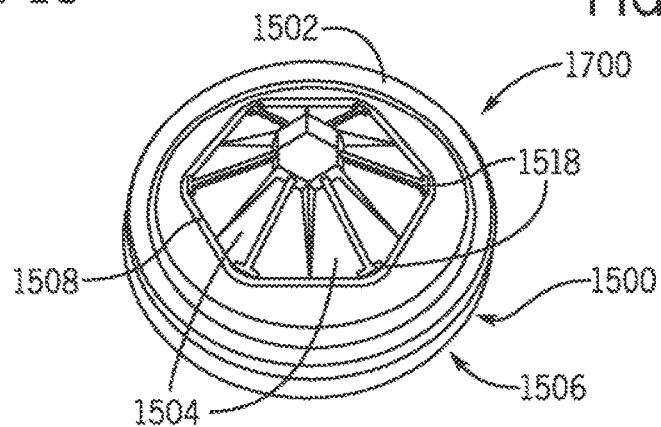
FIG. 17 is a bottom perspective view of the fourth embodiment of food waste disposer throat baffle of which the combination gasket of FIG. 15

Turning to FIG. 15, FIG. 16, and FIG. 17 in a further alternate baffle embodiment differing from the baffle 100, it is possible to integrate aspects of the annular manifold 102, the flaps 104, and the annular elastomer gasket 106 into a single combination gasket 1500 as shown. In such an embodiment, the combination gasket 1500 includes flap portions 1504 that are integral extensions of an annular elastomer gasket portion 1506. A lower rim portion 1502 of the annular elastomer gasket portion 1506 from which the flap portions 1504 extend, can be considered analogous to the annular manifold 102. Because the flap portions 1504 and the annular elastomer gasket portion 1506 (including the lower rim portion 1502) are integrally formed with one another, the combination gasket 1500 can be molded out of a single material and thus can avoid complications associated with the assembly of multiple components such as the annular manifold 102, the flaps 104, and the annular elastomer gasket 106. The combination gasket 1500 can be molded in a flap down, open configuration, as shown in FIG. 15 although, in other embodiments, the flap portions 1504 can be molded to extend in other directions.

In addition to FIG. 15, which shows a top perspective view of the combination gasket 1500, FIG. 16 also provides an additional bottom perspective view of the combination gasket 1500. FIG. 16 particularly illustrates how, in this embodiment, underside surfaces 1510 of the flap portions 1504 have several features, namely, center ribs 1512 and edge stiffeners 1514. The edge stiffeners 1514 respectively take the form of bent, downwardly-extending flanges of the respective flap portions 1504 that extend radially-inwardly along substantially the entire lengths of the respective side edges of the respective flap portions, up to and around respective tip portions 1516 of the respective flap portions. The center ribs 1512 respectively are ridges that extend from the respective tip portions 1516 of the respective flap portions 1504 radially-outwardly toward the lower rim portion 1502, along respective radially-extending midlines of the respective flap portions. Prior to reaching the lower rim portion 1502, the center ribs 1512 respectively terminate at respective T-shaped ends 1518.

Referring additionally to FIG. 17, the combination gasket 1500 of FIG. 15 and FIG. 16 can be implemented as a baffle 1700 upon the addition of an elastic (for example, rubber or TPE) band 1508 to the combination gasket. As shown by FIG. 17, which particularly provides a bottom perspective view of the baffle 1700, the elastic band 1508 when implemented on the combination gasket 1500 extends around the T-shaped ends 1518. By virtue of this arrangement, the elastic band 1508 applies pressure to each of the T-shaped ends 1518 and thereby to each of the flap portions 1504, which tends to move the respective flap portions to horizontal or largely-horizontal (or closed) positions from the molded open positions shown in FIG. 15 and FIG. 16. That is, a purpose of the center ribs 1512 is to translate the elastic (e.g., rubber) band spring force toward the center of the baffle 1700 and to force the flap portions 1504 into a closed position from the molded open position or, in other words, the elastic band 1508 exerts a spring force on the flap portions 1504 tending to close the flap portions.

Figure 18:
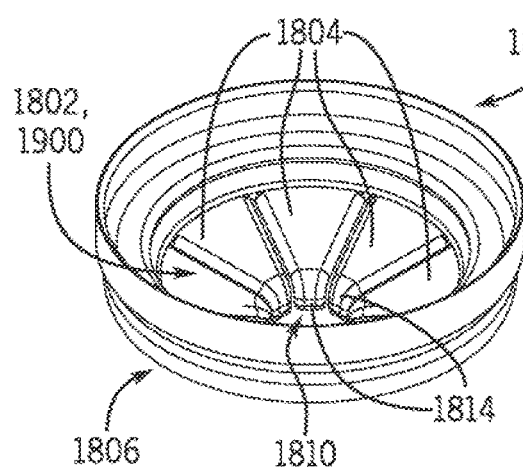
FIG. 18 is a top perspective view of an additional food waste disposer throat baffle in accordance with a fifth embodiment encompassed herein.

Referring next to FIG. 18, a top perspective view of an additional example baffle 1800 encompassed herein is shown. As described further in relation to FIG. 19, FIG. 20, FIG. 21 and FIG. 22, the baffle 1800 includes a substrate 1802 with multiple flaps 1804 and additionally a cylindrical gasket 1806. As was the case with the baffle 100, the baffle 1800 can form part of a food waste disposer as described above in regard to the baffle 100 and the food waste disposer 306. Also, the baffle 1800 can be implemented in regard to a strainer flange of a sink such as the strainer flange 302. In particular, as was the case with the annular elastomer gasket 106 of the baffle 100 described above, the cylindrical gasket 1806 is configured to allow for positioning of the baffle 1800 within a strainer flange in a sink, in the same or substantially the same manner as is shown in FIG. 3 regarding implementation of the baffle 100 in the strainer flange 302.

Figure 19:
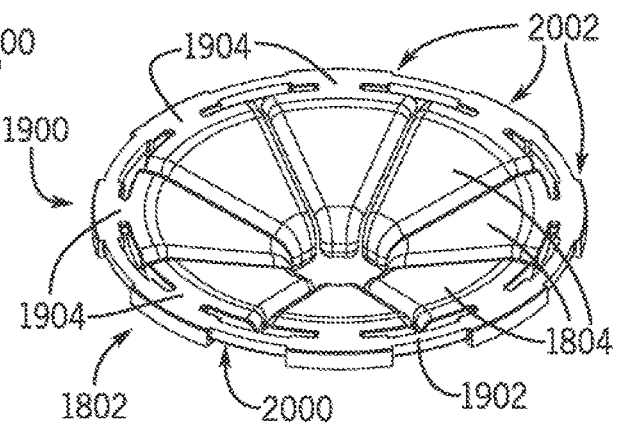
FIG. 19 is a top perspective view of a subassembly of components of the baffle of FIG. 18.
Figure 20:
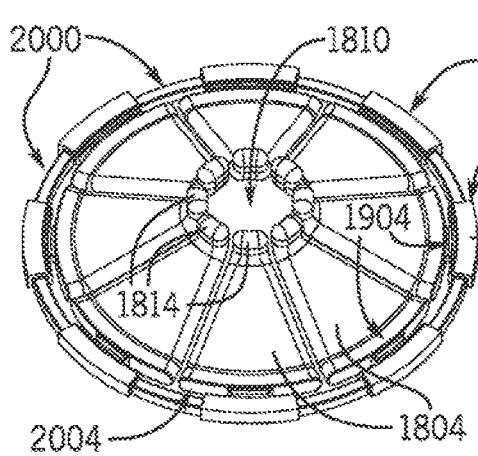
FIG. 20 is a bottom perspective view of the subassembly of FIG. 18.

Turning particularly to FIG. 19 and FIG. 20, additional top perspective and bottom perspective views are provided, respectively, of a subassembly 1900 that is included as part of the baffle 1800. The subassembly 1900 particularly includes the substrate (or substrate component) 1802 with the flaps 1804 mentioned above in regard to FIG. 18. Further as shown, the substrate 1802 includes an outer rim portion 1902 that surrounds all of the flaps 1804. Each of the flaps 1804 is connected to the outer rim portion 1902 by way of a respective living hinge 1904 extending outward from a respective radially-outward portion 2004 of the respective flap. In the present embodiment, each living hinge 1904 is essentially a narrow neck portion of the same material out of which each of the outer rim portion 1902 and the flaps 1804 are formed, and all of the outer rim portion 1902, the flaps 1804, and the living hinges 1904 linking the flaps with the outer rim portion 1902 are integrally formed as a single structure. In the present example embodiment, the substrate 1802 in its entirety, including outer rim portion 1902, the flaps 1804, and the living hinges 1904, can be made using silicone, which provides a tactile rubbery feel to the flaps 1804 and provides an appropriate level of robustness for the living hinges 1904.

Each living hinge 1904 serves to allow the respective flap 1804 associated with that living hinge to rotate upward and downward relative to the outer rim portion 1902 in substantially the same manner as each of the flaps 104 can rotate relative to the annular manifold 102 of the baffle 100 described above. More particularly, each of the flaps 1804 can be rotated relative to the outer rim portion 1902, as permitted by the respective one of the living hinges 1904, above or below a horizontal or largely horizontal (or closed) position in which the respective flap 1804 extends generally or substantially radially-inwardly toward a center of the outer rim portion 1902. In addition to permitting such rotation of the flaps 1804, the living hinges 1904 can also serve, during assembly or manufacture of the baffle 1800, as runners in the molding process, so as to allow for the molding of the flaps 1804 and the outer rim portion 1902 as one part.

It should be appreciated from FIGS. 19 and 20 that the flaps 1804 of the baffle 1800 can have features that are identical or substantially identical to those shown in FIG. 5 regarding the first one 400 of the flaps 104, except insofar as the flaps 1804 have the living hinges 1904 extending from the radially-outward portions 2004 of the flaps rather than the extension portions 502 (or pair of integrated pins 506). In particular, each of the flaps 1804 includes a respective tip portion 1814 that is elongated in the same manner as the tip portions 114. As shown in FIGS. 18, 19 and 20, when the flaps 1804 are all in the horizontal or largely-horizontal (or closed) positions, the tip portions 1814 of the flaps collectively define (or substantially define) an inner orifice 1810 of the baffle 1800.

Further, each of the flaps 1804 includes a respective main flat surface portion extending from the respective radially-outward portion 2004 of the respective flap toward the respective tip portions 114 of the flap, as well as a respective curved transition region linking the respective main flat surface portion with the respective tip portion. The main flat surface portions and curved transition regions of the flaps 1804 correspond to the main flat surface portions 112 and curved transition regions 508 of the flaps 104 described above. Additionally, each of the flaps 1804 also includes respective first and second side edges that are generally rounded or curved and that respectively correspond to the first and second side edges 510, 512 described above in regards to the flaps 104 of the baffle 100.

As is evident particularly from FIG. 20 (as well as partly from FIG. 19), the subassembly 1900 not only includes the substrate 1802 with the flaps 1804, but also includes a support ring 2000. The outer rim portion 1902 of the substrate 1802, in addition to extending entirely around all of the flaps 1804, also includes multiple (in this example, eight) circumferentially-extending channel segments 2002 through which the support ring 2000 passes. By virtue of the support ring 2000 passing through the circumferentially-extending channel segments 2002, the support ring is held in position relative to the substrate 1802 and therefore can provide support to the substrate so as to maintain the substantially-circular and flat shape of the outer rim portion 1902. The formation of the substrate 1802 in relation to the support ring 2000 can be considered a first step in assembling, manufacturing, or fabricating the baffle 1800. Notwithstanding the above description, in which the support ring 2000 is a distinct component relative to the substrate 1802 (and the outer rim portion 1902 thereof), in alternate embodiments a modified substrate can be employed in place of the substrate 1802. In such embodiments, the modified substrate can also include—in addition to flaps corresponding to the flaps 1804, living hinges corresponding to the living hinges 1904, and an outer rim portion corresponding to the outer rim portion 1902—an additional ring structural portion that corresponds to the support ring 2000 and that is integrally formed with the remainder of that modified substrate.

Figure 21:
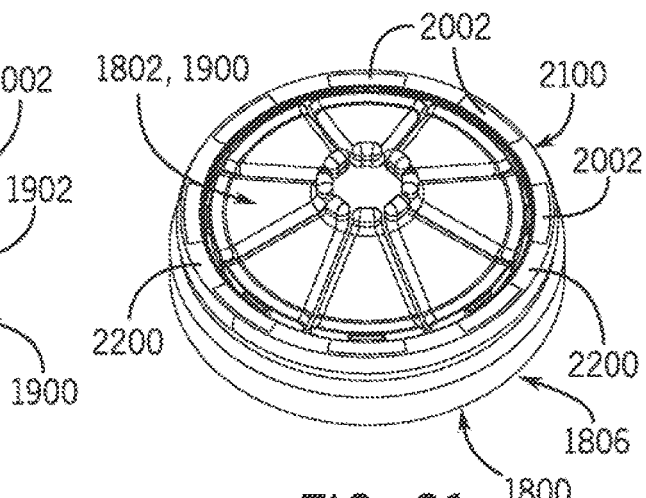
FIG. 21 is a bottom perspective view of the baffle of FIG. 18.
Figure 22:
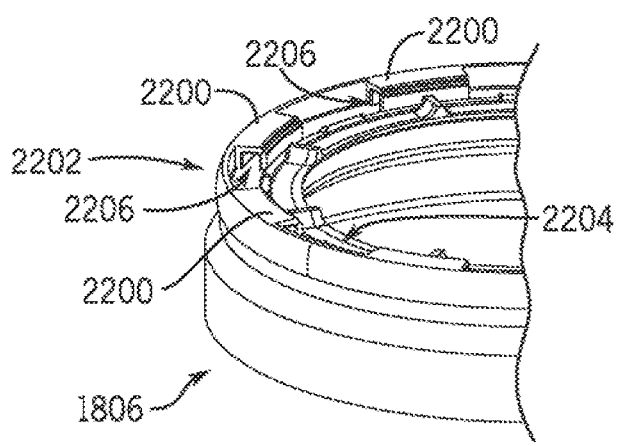
FIG. 22 is a cutaway bottom perspective view of a gasket portion of the baffle of FIG. 18 and FIG. 21.

Turning to FIG. 21 and FIG. 22, as already noted, the baffle 1800 not only includes the subassembly 1900 including the substrate 1802, but also includes the cylindrical gasket 1806, which constitutes an outer rim of the baffle 1800 for mounting in a strainer flange such as the strainer flange 302 of FIG. 3. In the present example embodiment, the cylindrical gasket 1806 is added to the subassembly 1900 by overmolding the substrate 1802 (and the support ring 2000 extending there within) with a thermoplastic elastomer (TPE) that forms the cylindrical gasket. The TPE-overmolded cylindrical gasket 1806, in addition to serving as the outer rim of the baffle 1800, also hides and protects the living hinges 1904 as is evident from FIG. 18. It should be appreciated that this overmolding operation can be considered a second step in the assembling, manufacturing, or fabricating process of the baffle 1800.

As already mentioned, in the present example embodiment, the substrate 1802 is formed from silicone and the cylindrical gasket 1806 is formed from TPE. Because TPE and silicone will not adhere to one another when overmolding occurs, in the present embodiment mechanical interlocks are additionally employed to join or attach the cylindrical gasket 1806 with the subassembly 1900, including the substrate 1802. More particularly in this regard, FIG. 21 shows a bottom perspective view of the baffle 1800 that shows how the cylindrical gasket 1806 is interlocked with the subassembly 1900, and FIG. 22 shows in more detail interlock features 2200 that are formed on the cylindrical gasket 1806. Notwithstanding the presence of the interlock features 2200, however, it should be appreciated that the baffle 1800 does not require any mechanical assembly. Rather, the baffle 1800 is molded in a two shot process from silicone and TPE, and the mechanical interlocks between the molded parts are provided to facilitating maintenance of the final assembly forming the baffle 1800 as an integrated unit.

As illustrated by FIG. 22, the interlock features 2200 are multiple flanges that are arranged along an outer perimeter 2202 of a bottom annular surface 2204 of the cylindrical gasket 1806. The interlock features 2200 particularly extend radially inward from the outer perimeter 2202 and then back (upward) toward the bottom annular surface 2204 so as to establish several channels 2206 through which the support ring 2000 can pass when the cylindrical gasket 1806 is assembled to the subassembly 1900. Further, as shown additionally by FIG. 21, the interlock features 2200 are spaced apart from one another circumferentially along the outer perimeter 2202 such that the circumferentially-extending channel segments 2002 of the outer rim portion 1902 are circumferentially interleaved among the interlock features 2200. Thus, with the cylindrical gasket 1806 formed by the TPE overmolding process, the tunnel-like interlock features 2200 are formed over the support ring 2000 between the circumferentially-extending channel segments 2002 of the outer rim portion 1902 that are circumferentially-aligned with the living hinges 1904. Accordingly, as shown in FIG. 21, a bottom annular outer perimeter surface 2100 of the baffle 1800 includes multiple (in this case, eight) alternating pairs of the interlock features 2200 and the circumferentially-extending channel segments 2002.

Referring additionally to FIG. 23 and FIG. 24, the present disclosure is also intended to encompass a modified version of the additional example baffle 1800, which is shown in FIG. 23 as a further example baffle 2300. FIG. 23 particularly shows a bottom perspective view of the baffle 2300 and FIG. 24 shows a bottom perspective view of a subassembly 2400 of components of the baffle 2300. As with the baffle 1800, the baffle 2300 includes a substrate 2302 with multiple flaps 2304 and additionally a cylindrical gasket 2306. Also as was the case with the baffle 1800, the baffle 2300 can form part of a food waste disposer (e.g., as described above in regard to the baffle 100 and the food waste disposer 306), and can be implemented in regard to a strainer flange of a sink (such as the strainer flange 302). In particular, as was the case with the cylindrical gasket 1806 of the baffle 1800 described above, the cylindrical gasket 2306 is configured to allow for positioning of the baffle 2300 within a strainer flange in a sink, in the same or substantially the same manner as is shown in FIG. 3 regarding implementation of the baffle 100 in the strainer flange 302.

Turning particularly to FIG. 24, the subassembly 2400 particularly includes the substrate (or substrate component)

2302 with the flaps 2304, and additionally the substrate 2302 includes an outer rim portion 2402 that surrounds all of the flaps 2304. Further, each of the flaps 2304 is connected to the outer rim portion 2402 by way of a respective living hinge 2404 extending outward from a respective radially-outward portion 2406 of the respective flap. Also as is evident particularly from FIG. 24, the subassembly 2400 not only includes the substrate 2302 with the flaps 2304, but also includes a support ring 2410. The outer rim portion 2402 of the substrate 2302, in addition to extending entirely around all of the flaps 2304, also includes multiple (in this example, eight) circumferentially-extending channel segments 2412 through which the support ring 2410 passes. By virtue of the support ring 2410 passing through the circumferentially-extending channel segments 2412, the support ring is held in position relative to the substrate 2302 and therefore can provide support to the substrate so as to maintain the substantially-circular and flat shape of the outer rim portion 2402. Although in the present embodiment the support ring 2410 can be a structure that is distinct from the substrate 2302, such that the subassembly 2400 includes the combination of both the substrate and the support ring, in other embodiments (and as discussed further below) the support ring and substrate can be integrally formed together as one structure.

As was the case with the living hinges 1904, each of the living hinges 2404 is essentially a narrow neck portion of the same material out of which each of the outer rim portion 2402 and the flaps 2304 are formed, and all of the outer rim portion 2402, the flaps 2304, and the living hinges 2404 linking the flaps with the outer rim portion 2402 are integrally formed as a single structure. Each of the living hinges 2404 serves to allow the respective flap 2304 associated with that living hinge to rotate upward and downward relative to the outer rim portion 2402 in substantially the same manner as each of the flaps 104 can rotate relative to the annular manifold 102 of the baffle 100 described above (as was also the case with the living hinges 1904, in terms of permitting relative movement of the flaps 1804 and the outer rim portion 1902). More particularly, each of the flaps 2304 can be rotated relative to the outer rim portion 2402, as permitted by the respective one of the living hinges 2404, above or below a horizontal or largely horizontal (or closed) position in which the respective flap 2304 extends generally or substantially radially-inwardly toward a center of the outer rim portion 2402. Further, it can be said that each of the flaps 2304 is at least indirectly supported in relation to the outer rim portion 2402 by the respective living hinge 2404 in a rotatable manner such that each of the flaps can rotate about a respective additional axis that is substantially tangent to a respective location along or proximate to the rim portion (this can also be said about each of the flaps 1804 relative to the outer rim portion 1902 by virtue of the respective living hinge 1904). In addition to permitting such rotation of the flaps 2304, the living hinges 2404 can also serve, during assembly or manufacture of the baffle 2300, as runners in the molding process, so as to allow for the molding of the flaps 2304 and the outer rim portion 2402 as one part.

It will be appreciated that FIG. 23 and FIG. 24 respectively correspond, in terms of the views of the baffle 2300 and subassembly 2400 that are provided, with the views of the baffle 1800 and subassembly 1900 that are provided by FIG. 21 and FIG. 20, respectively. At the same time, additional views of the baffle 2300, subassembly 2400, and gasket 2306 corresponding to the views of the baffle 1800, subassembly 1900, and gasket 1806 that are provided by FIG. 18, FIG. 19, and FIG. 22 are not provided. Rather, it should be understood that the particular views provided by FIG. 23 and FIG. 24 illustrate certain features of the baffle 2300 and subassembly 2400 thereof that differ to some extent from the features of the baffle 1800 and subassembly 1900 thereof, but that otherwise when the baffle 2300, subassembly 2400, and gasket 2306 are respectively viewed in the orientations/manners illustrated by FIG. 18, FIG. 19, and FIG. 22, the baffle 2300, subassembly 2400, and gasket 2306 respectively appear identical to the baffle 1800, subassembly 1900, and gasket 1806 as illustrated by FIG. 18, FIG. 19, and FIG. 22, respectively. That is, in the present embodiments of the baffle 2300 and baffle 1800 that are shown, all of the differences between the baffle 2300 and the baffle 1800 are visible from a comparison of FIG. 23 relative to FIG. 21, and/or from a comparison of FIG. 24 relative to FIG. 20.

Given the similarities between the baffle 2300 and the subassembly 2400 thereof relative to the baffle 1800 and subassembly 1900 thereof, it should be particularly appreciated from FIG. 23 and FIG. 24 that the flaps 2304 of the baffle 2300 can have features that are largely identical to those shown in FIG. 5 regarding the first one 400 of the flaps 104. In particular, each of the flaps 2304 includes a respective tip portion 2314 that is elongated in the same manner as the tip portions 114. Also, as shown in FIGS. 23 and 24, when the flaps 2304 are all in the horizontal or largely-horizontal (or closed) positions, the tip portions 2314 of the flaps collectively define (or substantially define) an inner orifice 2310 of the baffle 2300. Further, each of the flaps 2304 includes a respective main flat surface portion extending from the respective radially-outward portion 2406 of the respective flap toward the respective tip portion 2314 of the flap, as well as a respective curved transition region linking the respective main flat surface portion with the respective tip portion. The main flat surface portions and curved transition regions of the flaps 2304 correspond to the main flat surface portions 112 and curved transition regions 508 of the flaps 104 described above. Additionally, each of the flaps 2304 also includes respective first and second side edges that are generally rounded or curved and that respectively correspond to the first and second side edges 510, 512 described above in regards to the flaps 104 of the baffle 100. Further, similar to the discussion above in regard to the flaps 1804 of the baffle 1800, the flaps 2304 do also differ from the flaps 104 of the baffle 100 insofar as the flaps 2304 have the living hinges 2404 extending from the radially-outward portions 2406 of the flaps rather than the extension portions 502 (or pair of integrated pins 506).

Notwithstanding the aforementioned similarities between the baffle 2300 and subassembly 2400 thereof relative to the baffle 1800 and subassembly 1900 thereof, there are certain differences between the baffle 2300 and subassembly 2400 thereof relative to the baffle 1800 and subassembly 1900 thereof. In particular, as is evident from each of FIG. 23 and FIG. 24, each of the flaps 2304 of the subassembly 2400 includes a respective pair of strengthening ribs 2408 that each extend along the respective underside of the respective flap, substantially the entire extent of the respective main flat surface portion of the respective flap between the respective radially-outward portion 2406 (or respective living hinge 2404 at that respective radially-outward portion) and the respective tip portion 2314 of the respective flap. In the present example embodiment, each of the respective ribs 2408 of the respective pair of ribs of each respective flap 2304 has a diameter, as measured perpendicular to the elongated length dimension of the respective rib, which is less than half of the width of the respective tip portion 2314 of the respective flap 2304. Also in the present embodiment, each of the respective ribs 2408 formed on each respective one of the flaps 2304 particularly runs along and proximate to a respective side edge of the respective flap, that is, along and proximate to a respective edge of the respective flap that corresponds to either one of the first side edges 510 or one of the second side edges 512 discussed above in regard to the flaps 104 of the baffle 100. In this regard, each of the respective ribs 2408 can be spaced slightly toward the interior of the respective flap 2304, apart from the respective side edge of the respective flap, by a small distance (e.g., a distance that is substantially equal to or less than the width of the respective rib).

It should be noted that experimental testing has demonstrated that the inclusion of the strengthening ribs 2408 particularly can enhance the strength of the flaps 2304 from the standpoint of limiting or reducing the extent to which the flaps 2304 tend to move vertically upward (or downward, from the standpoint of the baffle 2300 when viewed upside-down as shown in FIG. 23) due to forces imparted upon the undersides of the flaps, e.g., as might occur during operation of a food waste disposer positioned beneath the flaps 2304 such as discussed in relation to FIG. 3. Indeed, according to some tests, due to the presence of a pair of the ribs 2408 along a given one of the flaps 2304, more (e.g., 3.4% more) or substantially more (e.g., 41.7% more) force is required to move the flap 2304 upward to a particular degree than would be required to move a substantially similar flap lacking such ribs upward to the same degree.

In the present example embodiment, the substrate 2302 in its entirety, including the outer rim portion 2402, the flaps 2304, and the living hinges 2404, can be made using silicone, which provides a tactile rubbery feel to the flaps 2304 and provides an appropriate level of robustness for the living hinges 2404. The formation of the substrate 2302 in relation to the support ring 2410 can be considered a first step in assembling, manufacturing, or fabricating the baffle 2300. Notwithstanding the above description, in which the support ring 2410 is a distinct component relative to the substrate 2302 (including the outer rim portion 2402, flaps 2304, and living hinges 2404 thereof), in other embodiments and as discussed further below, a modified substrate can be employed in place of the substrate 2302. In such embodiments, the modified substrate can also include in addition to flaps corresponding to the flaps 2304, living hinges corresponding to the living hinges 2304, and an outer rim portion corresponding to the outer rim portion 2402 an additional ring structural portion that corresponds to the support ring 2410 and that is integrally formed with the remainder of that modified substrate.

As already mentioned above, the baffle 2300 not only includes the subassembly 2400 including the substrate 2302, but also includes the cylindrical gasket 2306, which constitutes an outer rim of the baffle 2300 for mounting in a strainer flange such as the strainer flange 302 of FIG. 3. In the present example embodiment, the cylindrical gasket 2306 is added to the subassembly 2400 by overmolding the substrate 2302 (and the support ring 2410 extending therewithin) with a thermoplastic elastomer (TPE) that forms the cylindrical gasket. The TPE-overmolded cylindrical gasket 2306, in addition to serving as the outer rim of the baffle 2300, also hides and protects the living hinges 2304 (in the same manner as discussed above with respect to FIG. 18). In other embodiments, as discussed below, different materials other than TPE can be employed to perform the overmolding and to form the cylindrical gasket 2306 including, for example, urethane. It should be appreciated that this overmolding operation can be considered a second step in the assembling, manufacturing, or fabricating process of the baffle 2300.

As already mentioned, in the present example embodiment, the substrate 2302 is formed from silicone and the cylindrical gasket 2306 is formed from TPE. Because TPE and silicone will not adhere to one another when overmolding occurs, in the present embodiment mechanical interlocks are additionally employed to join or attach the cylindrical gasket 2306 with the subassembly 2400, including the substrate 2302. The bottom perspective view of the baffle 2300 particularly shows that the cylindrical gasket 2306 is interlocked with the subassembly 2400 again by way of interlock features 2420 that are formed on the cylindrical gasket 2306, spaced around an outer perimeter 2422 of that gasket. Notwithstanding the presence of the interlock features 2420, however, it should be appreciated that the baffle 2300 does not require any mechanical assembly. Rather, the baffle 2300 is molded in a two shot process from silicone and TPE, and the mechanical interlocks between the molded parts are provided to facilitating maintenance of the final assembly forming the baffle 2300 as an integrated unit.

As discussed above, FIG. 22 not only shows the cylindrical gasket 1806 but also is representative of the cylindrical gasket 2306 that engages the subassembly 2400 to form the baffle 2300. In this regard, it should be appreciated that the interlock features 2420 of the cylindrical gasket 2306 (which are shown in FIG. 23) take the same form as the interlock features 2200 shown in FIG. 22. That is, the interlock features 2420 take the form of multiple flanges that are arranged along the outer perimeter 2422 of the cylindrical gasket 2306, particularly around a bottom annular surface (corresponding to the bottom annular surface 2204) of the cylindrical gasket 2306. The interlock features 2420 extend radially inward from the outer perimeter 2422 and then back (upward) toward the bottom annular surface so as to establish several channels (corresponding to the channels 2206) through which the support ring 2410 can pass when the cylindrical gasket 2306 is assembled to the subassembly 2400. Further, as shown by FIG. 23, the interlock features 2420 are spaced apart from one another circumferentially along the outer perimeter 2422 such that the circumferentially-extending channel segments 2412 of the outer rim portion 2402 are circumferentially interleaved among the interlock features 2420. Thus, with the cylindrical gasket 2306 formed by the TPE overmolding process, the tunnel-like interlock features 2420 are formed over the support ring 2410 between the circumferentially-extending channel segments 2412 of the outer rim portion 2402 that are circumferentially-aligned with the living hinges 2404. Accordingly, as shown in FIG. 23, a bottom annular outer perimeter surface of the baffle 2300 (corresponding to the surface 2100 of FIG. 21) includes multiple (in this case, eight) alternating pairs of the interlock features 2420 and the circumferentially-extending channel segments 2412.

As mentioned above, although in some embodiments the support ring 2410 and substrate 2302 are separate, distinct structures that together form the subassembly 2400, in other embodiments the subassembly 2400 can instead be a flap ring structure having features that include both the features of the substrate 2302 (including the flaps 2304, outer rim portion 2402, and living hinges 2420) as well as the features of the support ring 2410. In such embodiments, the support ring 2410 and substrate 2302 can be considered to be integrally formed with one another. In at least some such embodiments, such a flap ring structure (or simply flap ring) with its multiple interconnected flaps will typically be the first part to be molded. Further, the flap ring in some such embodiments can be made from a material having excellent creep resistance at elevated temperatures, so as to prevent the flaps from sagging over time with exposure to hot water. Additionally, a material providing tear resistance is also desirable, to prevent torn flaps. One material that can satisfy these objectives can be, for example, cast RTV (room-temperature-vulcanizing) silicone, with Shore A Hardness of approximately 40, can be employed. Such a silicone material can exhibit excellent chemical, heat, and tear resistance. Additionally, for production it can be appropriate to employ injection molding grades of silicone.

Regardless of whether the support ring 2410 and the substrate 2302 are separate, distinct structures that form the subassembly 2400 or instead are integrally formed with one another as a flap ring, the cylindrical gasket 2306 can in each case serve several purposes. In particular, the cylindrical gasket 2306 can serve to retain the overall baffle assembly (e.g., the baffle assembly 2300) within a sink drain, as well as serve to house the subassembly 2400/flap ring, and further particularly serve to shield the living hinges 2404 of the subassembly 2400/flap ring from objects falling into the sink/drain. The cylindrical gasket 2306 particularly can be molded over the subassembly 2400/flap ring and form mechanical interlocks around the ring as illustrated by FIG. 22 and FIG. 23. So as to allow the flaps 2304 of the subassembly 2400/flap ring to freely rotate about hinge points provided by the living hinges 2404, the cylindrical gasket 2306 can be made of a material that does not chemically bond to the material forming the subassembly 2400/flap ring. Such a material can for example be a cast urethane was utilized with a Shore A Hardness of approximately 60, particularly insofar as urethane does not chemically bond to silicone and offers good chemical resistance to common chemicals used in sinks. Also, injection molded thermoplastic elastomers may be used in production. Regardless of what particular materials are employed, the materials are chosen such that, when the gasket is overmolded onto the flap ring, the gasket material does not bond (chemically or otherwise) with the flap ring, which allows the flaps to be able to move.

It should be further appreciated that, during the making/manufacture/assembly of the baffle 2300, regardless of whether the support ring 2410 and the substrate 2302 are separate, distinct structure or integrally formed with one another, the order of molding steps that are performed should be consistent with the materials that are used for the different components. For example, manufacturing of an embodiment of the baffle 2300 having the flap ring in which the support ring and substrate are integrally formed with one another, typically will involve a first molding step in which the flap ring is formed from a first material, followed by a second molding step in which the cylindrical baffle 2306 is formed from a second material that is molded around the flap ring. In such a process, the first material melting temperature associated with the first molding step (forming the "first shot") typically will be higher than that of the subsequent shot(s) (e.g., the second material melting temperature associated with the second molding step), so that the first shot does not melt or deform when the second material is injected. The materials mentioned above—and especially silicone being employed as the first shot material used for the flap ring—satisfy these goals. Indeed, silicone has a very high melt temperature and allows for a large range of melt temperatures when selecting the second shot material (whether urethane or another material).

Further in regard to the baffle 2300 of FIG. 23 described above, FIG. 25 and FIG. 26 are additionally provided to show perspective views of cutaway portions of cross-sections of that baffle. FIG. 25 particularly shows a perspective view of one cutaway portion of one cross-section of the baffle 2300. The particular view of FIG. 25 illustrates the baffle 2300 when it is in a non-inverted position, that is, a position typical of normal implementation in relation to a sink and waste disposer (e.g., according to which material proceeds downward from the sink drain, through the baffle, and into the waste disposer). It should be appreciated that, although FIG. 25 is intended to show a cross-section of a portion of the baffle 2300, the one of the flaps 2304 of the substrate 2302 that is shown is in a somewhat depressed position relative to the flaps 2304 shown in FIG. 23, as if that one flap was being pushed downward (e.g., as would often be the case in circumstances in which material is passing downward through the baffle 2300 from a sink into a disposer). Such a depressed position would correspond to positioning of any of the flaps 2304 upwardly by comparison with the positioning of the flaps shown in FIG. 23, because the baffle 2300 is shown in an inverted position (relative to how the baffle would typically be positioned in relation to a sink and waste disposer).

FIG. 26 is an additional perspective view of an additional cutaway portion of an additional cross-section of the baffle 2300 of FIG. 23, taken when that baffle is in an inverted position (e.g., consistent with the position of the baffle as shown in FIG. 23). In contrast to FIG. 25, the one of the flaps 2304 of the substrate 2302 that is shown in FIG. 26 is in a somewhat elevated position relative to the flaps 2304 shown in FIG. 23, as if that one flap was being pushed upward (e.g., due to an air bubble within the waste disposer or as could occur during operation of a waste disposer if material within the waste disposer was driven upward). Such an elevated position would correspond to positioning of any of the flaps 2304 downwardly by comparison with the positioning of the flaps shown in FIG. 2, again because the baffle 2300 is shown in an inverted position (relative to how the baffle would typically be positioned in relation to a sink and waste disposer). For purposes of the description provided below, it can be assumed that the one of the flaps 2304 that is shown in FIG. 25 is also the same one of the flaps 2304 that is shown in FIG. 26.

FIG. 25 and FIG. 26 each show not only one of the flaps 2304 of the substrate 2302 of the baffle 2300, and a portion of the cylindrical gasket 2306 of the baffle 2300, but also illustrate additional aspects of the baffle 2300 as well. In particular, FIG. 26 shows the pair of strengthening ribs 2408 that are present along the underside surface of the one of the flaps 2304 that is shown, and that extend substantially the entire distance between the tip portion 2314 of that flap and the one of the living hinges 2404 coupling that flap with a corresponding one of the circumferentially-extending channel segments 2412 (of the outer rim portion 2402 of the substrate 2302). Additionally, FIG. 25 further illustrates how the cylindrical gasket 2306 extends radially inwardly from the location of the support ring 2410, so as to extend to (or even past) the radially-outward portion 2406 of the one of the flaps 2304 that is shown, such that the cylindrical gasket 2306 covers over (and protects) the one of the living hinges 2404 (not shown) that couples that flap to the outer rim portion 2402 (not shown). Further, not only does each of FIG. 25 and FIG. 26 show a respective cross-section that illustrates how the cylindrical gasket 2306 is overmolded (and molded around) the support ring 2410, but also FIG. 26 in particularly illustrates a junction 2424 between the cylindrical gasket 2306 and the substrate 2302. In particular, it will be appreciated from FIG. 26 that the junction 2424 exists between the one of the circumferentially-extending channel segments 2412 that is shown in FIG. 26 and adjacent ones of the interlocking features 2420 also shown in FIG. 26. Additionally, FIG. 26 shows how the junction 2424 exists between the cylindrical gasket 2306 and the one of the flaps 2304 shown therein (particularly along the radially-outward portion 2406 of that flap), particularly when that flap is in the elevated position shown in FIG. 26.

It should be appreciated that the cylindrical gasket 2306 of the baffle 2300, by way of contact with the flaps 2304 at locations such as (for example) the junction 2424, can provide forces in relation to the flaps that tend to cause the respective flaps to remain at their respective closed positions (e.g., horizontal or largely-horizontal positions) when already at the respective closed positions, or to return to their respective closed positions when not at the respective closed positions. In some embodiments, such forces provided by the cylindrical gasket 2306 are entirely or substantially responsible for retaining the flaps 2304 at, and/or returning the flaps to, the respective closed positions, although in other embodiments the flaps 2304 are retained at, or returned to, their closed positions due to spring forces provided by the living hinges 2404, or by a combination of the forces provided by the living hinges and the cylindrical gasket. In such manners, the flaps 2304 can be retained at, or returned to, their closed positions without the use of an elastic band such as any of the elastic bands (e.g., the elastic bands 108, 1508) described above. Similarly, it should be appreciated that the flaps 1804 of the baffle 1800 also can be retained at, or returned to, their closed positions by way of forces applied by the cylindrical gasket 1806 relative to the flaps, or due to spring forces provided by the living hinges 1904, or by a combination of such different types of forces.

Although differing in some respects from the baffle 100 described above, the baffles 1800 and 2300 may achieve one or more advantages that are identical or substantially similar to one or more of those described above in regard to the baffle 100. For example, in at least some cases, each of the baffles 1800 and 2300 can fit into a strainer flange such as the strainer flange 302 of FIG. 3 and would be removable from a sink opening to leave the full drain opening accessible to a user. Also, for example, given the shape of the flaps 1804 that include the elongated tip portions 1814 of the baffle 1800, or the shape of the flaps 2304 that include the elongated tip portions 2314 of the baffle 2300, in some cases it may be easier for a user to remove the user's hand or fingers either of the baffles 1800 or 2300 (after being inserted into either of the baffles) and away from a food waste disposer (and thus avoid finger-trapping) than is the case with one or more conventional baffles.

Further, although neither of the baffles 1800 and 2300 in the present embodiment includes-any elastic band corresponding to the elastic band 108, nevertheless, each of the baffles 1800 and 2300 can be considered an active baffle design. The living hinges 1904 that couple the flaps 1804 with the outer rim portion 1902 in the baffle 1800, and the living hinges 2404 that couple the flaps 2304 with the outer rim portion 2402 in the baffle 2300, particularly allow for force to be exerted upon the respective flaps tending to cause those respective flaps to remain at, or to return to, horizontal or largely-horizontal (or closed) positions such as those shown in FIG. 18, FIG. 21, and FIG. 23. At the same time, in alternate embodiments, elastic bands can be additionally provided that extend around the flaps and that further cause the flaps to remain at, or to return to, the horizontal or largely-horizontal (or closed) positions.

As active baffle designs, each of the baffles 1800 and 2300 also may provide any of a variety of further advantages (e.g., in addition to or instead of any of those mentioned above) by comparison with one or more conventional passive baffle designs including, further for example, enhanced sound reduction, increased ease of food waste insertion, and improved, appropriate, water draining (e.g., so as to avoid water back-up into the drain opening that may create the perception of a clogged sink) regardless of the water flow characteristics of the installation.

Further, although it is possible for all of the flaps 1804 of the baffle 1800 to move in unison, as well as possible for all of the flaps 2304 of the baffle 2300 to move in unison, it is also possible for any of the flaps of either of those baffles to move individually, or for two or more of the flaps to move while one or more others of the flaps do not move, or for different one(s) of the flaps to move to different degrees than other one(s) of the flaps of that baffle. This is to be contrasted with one or more conventional pleated baffle designs in which, as discussed above, the pleats of the baffle all are interconnected and move together, such that the combined stiffness of all of the pleats may be too high for the pleats to be displaced and allow water to flow through the baffle properly under certain water flow conditions. That is, each of the baffles 1800 or 2300 may operate in a manner such that, in some operational circumstances, only a subset of the flaps 1804 or 2304 of the respective baffle is or are displaced in response to water flow, thereby facilitating the water flow.

Although several example embodiments of baffles have been described above, the present disclosure is intended to encompass numerous other embodiments as well. For example, although several of the embodiments of baffles described above employ elastic bands while others do not, the present disclosure is intended to encompass other embodiments that differ from one or another of those described above in terms of the presence or absence of an elastic band, as well as other embodiments in which there are multiple elastic bands instead of only a single elastic band. For example, the present disclosure is intended to encompass embodiments of baffles having flaps and living hinges in combination with elastic bands, where the elastic bands (by themselves, or in combination with the living hinges, or possibly additionally in combination with gaskets such as the cylindrical gaskets 1806 or 2306) serve to cause the flaps to be retained in, or to return to, their closed positions. Further, the present disclosure is intended to encompass embodiments in which the baffles, or component parts thereof, are made of other materials than those described above. Also, although the above-described embodiments of baffles have flaps that are substantially sector-shaped, with the flaps of each given baffle being identical or substantially identical with one another, in other embodiments the flaps can take on different shapes and, indeed, in some other embodiments different ones of the flaps of a given baffle can have different shapes. Additionally, although the baffles described above are annular or substantially annular in cross-section, the present disclosure is also intended to encompass other baffle designs that have other shapes.

Further, although some rim portions described above such as the outer rim portions 1902 and 2402 are shown as fully circumferentially extending fully around the central axis of the baffle (and extending so as to surround all of the flaps of a baffle in a continuous manner), the present disclosure is also intended to encompass embodiments in which such rim portions only extend partly around the central axis of the baffle. For example, in some such embodiments, an outer rim portion can have a circumferential extent limited to that provided by the circumferentially-extending channel segments 2002 or 2412 of the baffles 1800 or 2300, respectively. In some such embodiments, further structural rigidity of the respective baffle (and particularly of the substrate thereof) can be provided by the inclusion of a support ring such as either of the support rings 2000 or 2410 to link the various ones of the circumferentially-extending channel segments. Such embodiments can still be considered embodiments in which the outer rim portion, with a circumferential extent limited to that provided by the circumferentially-extending channel segments, extends substantially circumferentially around a central axis of the baffle. Further, notwithstanding the description above concerning certain connecting features such as integrated pins that fit within slots, in other embodiments other connecting features can be employed, including features that are the inverse of those described above (e.g., embodiments in which pins formed on an annular manifold fit within slots formed on flaps).

In addition, notwithstanding any description above concerning manners of assembling, manufacturing, fabricating, or operating any baffles or related or associated structures, the present disclosure is intended to encompass additional manners of assembling, manufacturing, fabricating, or operating any baffles or related or associated structures, including ones in which various procedural steps have been added, changed, or omitted relative to anything described above. Additionally, notwithstanding the usage of terms describing directional orientations of baffles, component parts, or other structures herein, relative to ground or otherwise, such as downward, upward, bottom, or top, the present disclosure is intended to encompass embodiments in which such baffles, components parts, or other structures have other orientations, and the present disclosure is not intended to be limited to any particular orientations described herein. Further, numerical ranges provided herein are understood to be exemplary and should be understood to include all possible numerical ranges situated there between.

Further, in least some example embodiments, the present disclosure relates to a baffle for implementation in connection with a food waste disposer. The baffle includes a rim portion substantially circumferentially extending around a central axis of the baffle, and a plurality of flaps at least indirectly supported by the rim portion, where each of the flaps is substantially sector-shaped. The baffle also includes an annular portion connected or integrally formed with the rim portion, where the annular portion includes an outer surface configured to facilitate mounting of the baffle in relation to an external structure. Each of the flaps is at least indirectly supported in relation to the rim portion in a rotatable manner such that each of the flaps can rotate about a respective additional axis that is substantially tangent to a respective location along or proximate to the rim portion. Also, each of the flaps can be rotated so as to attain a respective closed position in which the respective flap extends radially inwardly, from a respective radially-outward portion of the flap positioned proximate to the respective location to a respective tip portion of the flap. Additionally, when each of the flaps is respectively rotated so as to attain the respective closed position, the respective tip portions of the respective flaps collectively substantially define an inner orifice of the baffle through which the central axis passes. Further, the baffle includes one or more components that tend to cause the respective flaps to remain at the respective closed positions when already at the respective closed positions, and that tend to cause the respective flaps to return to the respective closed positions when not at the respective closed positions.

Additionally, in at least some such embodiments, each of the flaps includes a respective first coupling formation, at or proximate to the respective radially-outward portion of the respective flap, which is configured to interface with a respective second coupling formation on the rim portion, and the respective axes about which the respective flaps can rotate are defined by the first or second coupling formations. Further, in at least some such embodiments, the respective first coupling formation includes a respective pin, the second coupling formation includes a respective slot, and each of the respective flaps is attached to the rim portion by way of the respective pin being positioned within the respective slot. Additionally, in at least some such embodiments, the one or more components include a plurality of torsion springs that are respectively positioned so as to extend around the respective pins. Further, in least some such embodiments, the rim portion is integrally formed with respect to the annular portion, the one or more components include a plurality of finger extensions of the rim portion, and the respective finger extensions respectively extend into respective receiving orifices within the respective flaps.

Further, in at least some example embodiments encompassed herein, the present disclosure relates to a baffle for implementation in connection with a food waste disposer. The baffle includes a rim portion substantially circumferentially extending around a central axis of the baffle, a plurality of flaps, and a plurality of living hinges, where the respective living hinges respectively link the respective flaps to the rim portion such that the rim portion, living hinges, and flaps constitute a single integrally-formed structure. The respective living hinges permit the respective flaps to be rotatable about respective axes that respectively are substantially tangent to respective locations along or proximate to the rim portion, so that the respective flaps can be rotated to respective closed positions. Further, either the living hinges or at least one additional component tend to cause the respective flaps to remain at the respective closed positions or to return to the respective closed positions when not at the respective closed positions.

Additionally, in at least some example embodiments encompassed herein, the present disclosure relates to a method of assembling a baffle that is for implementation in connection with a food waste disposer. The method includes providing a primary structure having a first structural portion and a ring structural portion, where the first structural portion includes a rim portion substantially circumferentially extending around a central axis of the baffle, a plurality of flaps, and a plurality of living hinges that together constitute a single integrally-formed structure that is formed from a first material, and where the ring structural portion is connected with or integrally formed with the first structural portion. The method further includes overmolding a secondary structure on the primary structure, where the secondary structure is formed from a second material, and where the secondary structure includes a plurality of interlocking features that facilitate coupling of the secondary structure in relation to the primary structure. Either the living hinges or at least one additional component tend to cause the respective flaps to remain at the respective closed positions or to return to the respective closed positions when not at the respective closed positions.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of assembling a baffle that is for implementation in connection with a food waste disposer, the method comprising:
providing a primary structure having a first structural portion and a ring structural portion, wherein the first structural portion includes a rim portion circumferentially extending around a central axis of the baffle and a plurality of flaps, wherein each of the flaps is at least indirectly supported by the rim portion, and wherein the ring structural portion is connected with or integrally formed with the first structural portion; and
overmolding a secondary structure on the primary structure, wherein the secondary structure is formed from a thermoplastic elastomer (TPE) material, and wherein the secondary structure includes a plurality of interlocking features that facilitate coupling of the secondary structure in relation to the primary structure;
wherein at least one additional component tends to cause the respective flaps to remain at respective closed positions or to return to the respective closed positions when not at the respective closed positions, and
wherein the at least one additional component includes an elastic band component, and wherein each of the flaps includes a respective protrusion along a respective underside of the respective flap proximate a radially-outward portion of the respective flap, and wherein the elastic band component is positioned so as to extend circumferentially around the protrusions so as to apply respective forces to the respective flaps.

2. The method of claim 1, wherein each of the flaps includes a respective first coupling formation, at or proximate to the respective radially-outward portion of the respective flap, which is configured to interface with a respective second coupling formation on the rim portion, and wherein respective axes about which the respective flaps can rotate are defined by the first or second coupling formations.

3. The method of claim 2, wherein each of the respective first coupling formations includes at least one respective pin, wherein each of the second coupling formations includes at least one respective slot, and wherein each of the respective flaps is attached to the rim portion by way of the at least one respective pin being positioned within the at least one respective slot.

4. The method of claim 3, wherein the rim portion includes a plurality of orifices and the ring structural portion includes a plurality of spigots, wherein the ring structural portion is attached to the rim portion due to the spigots being positioned so as to extend into the orifices, wherein each of the flaps has a respective tip portion and each of the tip portions of the respective flaps extends in a direction that is substantially parallel to the central axis when the respective flap is in the respective closed position, wherein the respective tip portion of each of the flaps is coupled to a respective flat surface portion of the respective flap that extends to the respective radially-outward portion of the respective flap by a respective rounded section of the flap, and wherein each of the flaps has a pair of respective side edges that are rounded.

5. The method of claim 1, wherein the respective flaps are integrally formed with the rim portion, and the rim portion is integrally formed with the ring structural portion, such that the flaps, rim portion, and ring structural portion constitute an integrated structure.

6. The method of claim 5, wherein each of the flaps includes a respective rib extending along the respective underside of the respective flap from a respective tip portion of the respective flap to the respective protrusion along the respective underside of the respective flap, and wherein each of the flaps also includes stiffeners extending along respective side edges of the respective flap.

7. The method of claim 1, wherein each of the flaps is at least indirectly supported in relation to the rim portion in a rotatable manner such that each of the flaps can rotate about a respective additional axis that is substantially tangent to a respective location along or proximate to the rim portion.

8. The method of claim 7, further comprising a plurality of living hinges, wherein the respective living hinges respectively link the respective flaps to the rim portion, wherein the respective living hinges allow the respective flaps to be rotated about the respective additional axes.

9. The method of claim 8, wherein the at least one additional component that tends to cause the respective flaps to return to the respective closed positions when not at the respective closed positions includes the plurality of living hinges.

10. The method of claim 9, wherein the respective living hinges are integrally formed with the respective flaps and integrally formed with the rim portion, such that the flaps, living hinges, and rim portion are included by the first structural portion, and wherein the ring structural portion constitutes a second structural portion that is distinct from, but at least indirectly attached to, the first structural portion.

11. The method of claim 10, wherein the rim portion, the plurality of flaps, and the plurality of living hinges together constitute a single integrally-formed silicone structure.

12. The method of claim 11, wherein the rim portion includes a plurality of channels through which the ring structural portion passes, and wherein the interlocking features are configured to grasp the ring structural portion.

13. The method of claim 1, wherein each of the flaps can be rotated so as to attain the respective closed position in which the respective flap extends radially inwardly, from the respective radially-outward portion of the respective flap to a respective tip portion of the flap; and
wherein when each of the flaps is respectively rotated so as to attain the respective closed position, the respective tip portions of the respective flaps collectively substantially define an inner orifice of the baffle through which the central axis passes.

14. A method of operating a baffle that is for implementation in connection with a food waste disposer, the method comprising:
providing a primary structure having a first structural portion and a ring structural portion, wherein the first structural portion includes a rim portion circumferentially extending around a central axis of the baffle and a plurality of flaps, wherein the ring structural portion is connected with or integrally formed with the first structural portion; and
causing, by at least one additional component, the respective flaps to remain at or return to respective closed positions, wherein the at least one additional component includes an elastic band component, and wherein each of the flaps includes a respective protrusion along a respective underside of the respective flap proximate a radially-outward portion of the respective flap, and wherein the elastic band component is positioned so as to extend circumferentially around the protrusions so as to apply respective forces to the respective flaps.

15. The method of claim 14, wherein each of the flaps includes a respective first coupling formation, at or proximate to the respective radially-outward portion of the respective flap, which is configured to interface with a respective second coupling formation on the rim portion, and wherein respective axes about which the respective flaps can rotate are defined by the first or second coupling formations.

16. The method of claim 15, wherein each of the respective first coupling formations includes at least one respective pin, wherein each of the respective second coupling formations includes at least one respective slot, and wherein each of the respective flaps is attached to the rim portion by way of the at least one respective pin being positioned within the at least one respective slot.

17. The method of claim 16, wherein the rim portion includes a plurality of orifices and the ring structural portion includes a plurality of spigots, wherein the ring structural portion is attached to the rim portion due to the spigots being positioned so as to extend into the orifices, wherein each of the flaps has a respective tip portion and each of the tip portions of the respective flaps extends in a direction that is substantially parallel to the central axis when the respective flap is in the respective closed position, wherein the respective tip portion of each of the flaps is coupled to a respective flat surface portion of the respective flap that extends to the respective radially-outward portion of the respective flap by a respective rounded section of the flap, and wherein each of the flaps has a pair of respective side edges that are rounded.

18. The method of claim 14, further comprising:
   overmolding a secondary structure on the primary structure.

19. The method of claim 18, wherein the primary structure is a silicone structure, and wherein the secondary structure is formed from a thermoplastic elastomer (TPE) material.

20. The method of claim 19,
   wherein the secondary structure includes a plurality of interlocking features that facilitate coupling of the secondary structure in relation to the primary structure; and
   wherein the at least one additional component by which the respective flaps are caused to remain at or return to the respective closed positions includes a plurality of living hinges.

* * * * *